(12) United States Patent
Akahori

(10) Patent No.: US 7,574,036 B2
(45) Date of Patent: Aug. 11, 2009

(54) APPARATUS, PROGRAM, AND RECORDING MEDIUM FOR LEARNING DATA TO FORM A SELF-ORGANIZING MAP COMPRISED OF REFERENCE VECTORS CORRESPONDING TO FEATURES OF AN IMAGE AND USED FOR DETERMINING OBJECTS IN AN IMAGE

(75) Inventor: Sadato Akahori, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 987 days.

(21) Appl. No.: 10/806,476

(22) Filed: Mar. 23, 2004

(65) Prior Publication Data

US 2005/0125368 A1    Jun. 9, 2005

(30) Foreign Application Priority Data

Mar. 24, 2003  (JP)  ............................. 2003-079574
Mar. 15, 2004  (JP)  ............................. 2004-072646

(51) Int. Cl.
*G06K 9/62*    (2006.01)

(52) U.S. Cl. ...................... 382/159; 382/155; 382/156; 700/47; 700/48

(58) Field of Classification Search .................. 382/159
See application file for complete search history.

(56) References Cited

U.S. PATENT DOCUMENTS 7,099,510 B2 *   8/2006   Jones et al. .................. 382/225

FOREIGN PATENT DOCUMENTS

| JP | 2001-283184 A | 10/2001 |
|----|---------------|---------|
| JP | 2001-306612 A | 11/2001 |
| JP | 2001-337953 A | 12/2001 |
| JP | 2002-41545 A  | 2/2002  |

* cited by examiner

*Primary Examiner*—Vikkram Bali
*Assistant Examiner*—Edward Park
(74) *Attorney, Agent, or Firm*—Sughrue Mion, PLLC

(57) ABSTRACT

A temporary self-organizing map in which classes are associated with respective vector points is first derived by a first learning section of a data learning apparatus. Thereafter, by use of, for example, an improved method incorporating concept of vicinity learning intp learning vector quantization, a second learning section modifies the temporary self-organizing map and obtains a final self-organizing map. By use of the final self-organizing map thus derived, image meaning determining processing is performed.

10 Claims, 24 Drawing Sheets

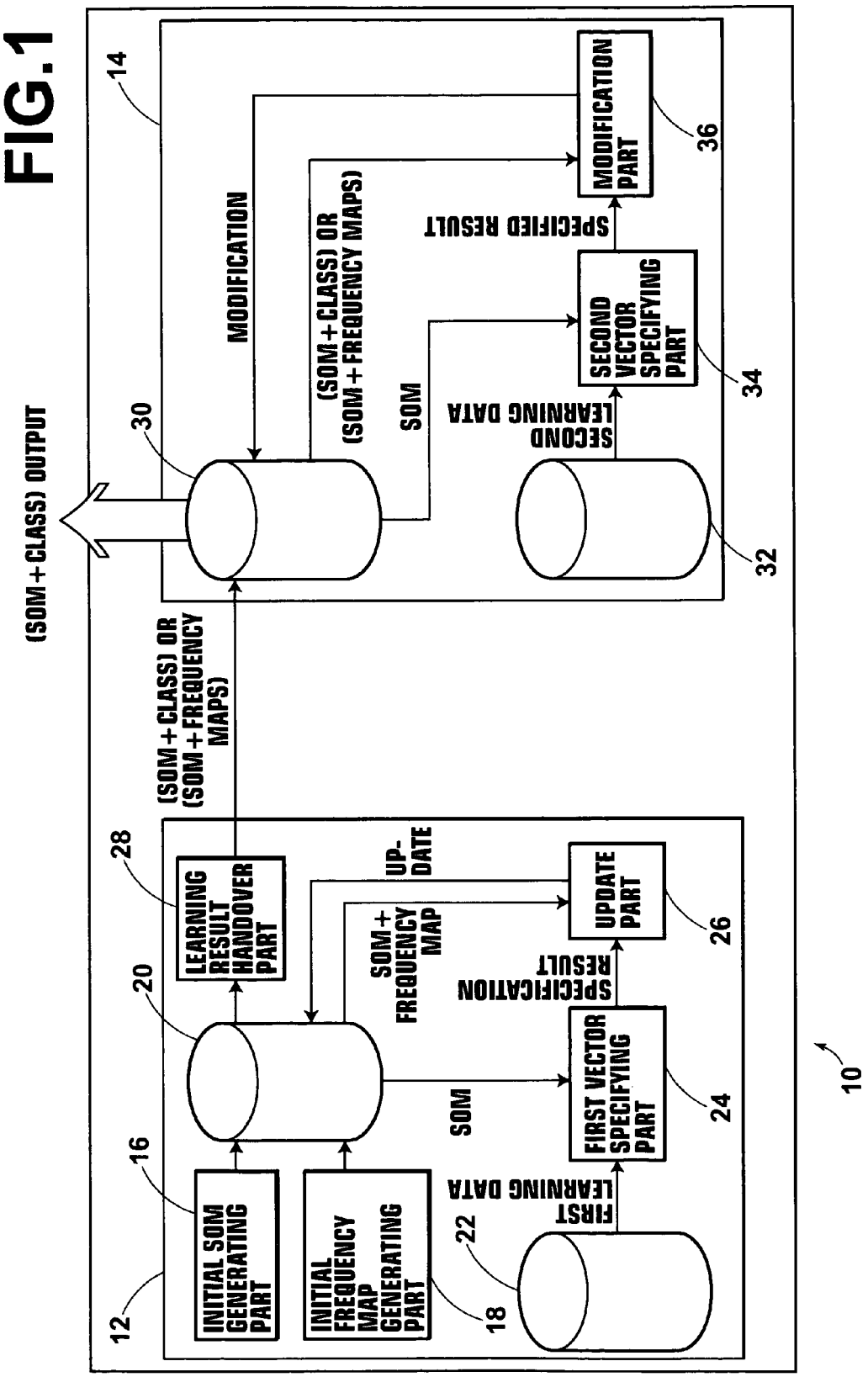

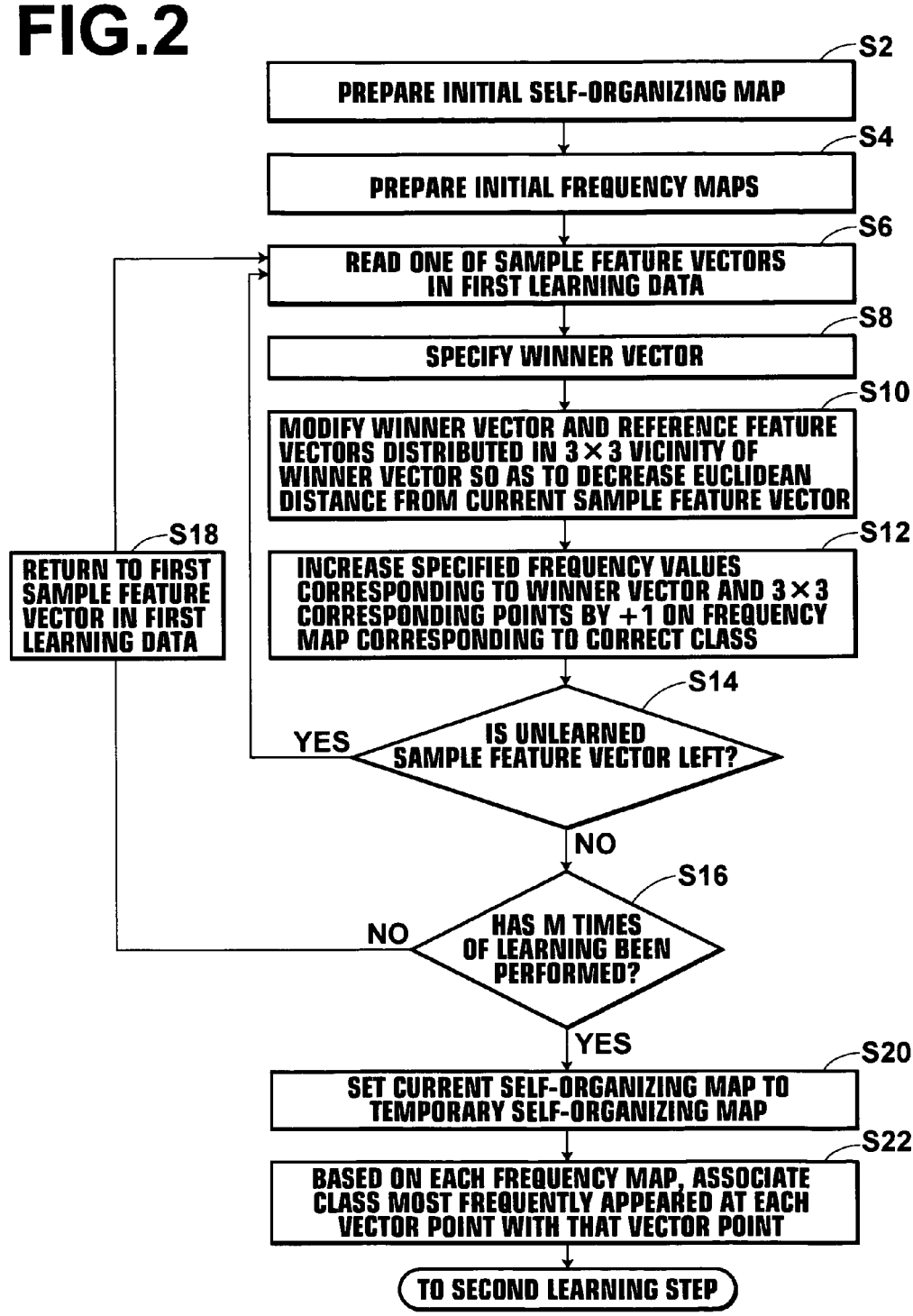

| SKY | MOUNTAIN |

FIELD

| -1 | 0 | 1 |
|----|---|---|
| -1 | 0 | 1 |
| -1 | 0 | 1 |

VERTICAL EDGE DETECTION FILTER

FIG.4A

| -1 | -1 | -1 |
|----|----|----|
| 0  | 0  | 0  |
| 1  | 1  | 1  |

HORIZONTAL EDGE DETECTION FILTER

FIG.4B

**SAMPLE FEATURE VECTOR
(CORRESPONDING CLASS: SKY)**
3×3 VICINITY
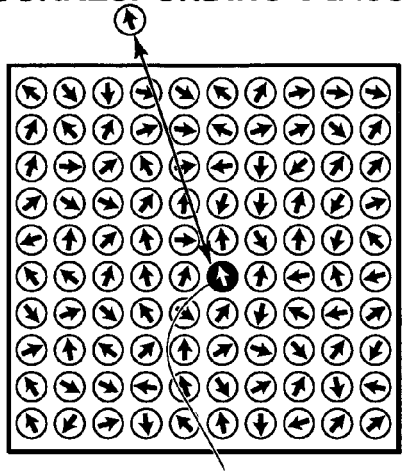
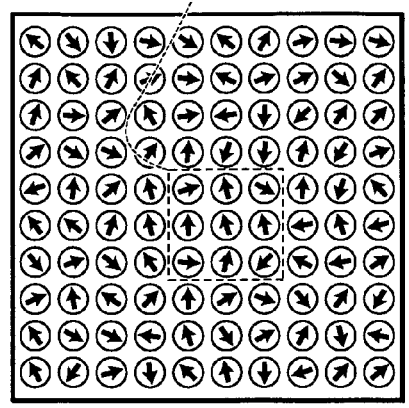
WINNER VECTOR
FIG.7A
```
0 0 0 0 0 0 0 0 0
0 0 0 0 0 0 0 0 0
0 0 1 1 1 0 0 0 0
0 0 1 1 1 0 0 0 0
0 0 1 1 2 1 1 0 0 0
0 0 0 0 1 1 1 0 0 0
0 0 0 0 1 1 1 0 0 0
0 0 0 0 0 0 0 0 0
0 0 0 0 0 0 0 0 0
0 0 0 0 0 0 0 0 0
```
SKY
```
0 0 0 0 0 0 0 0 0
0 0 0 0 0 0 0 0 0
0 0 0 0 0 0 0 0 0
0 0 0 0 0 0 0 0 0
0 0 0 0 0 1 1 1 0
0 0 0 0 0 1 1 1 0
0 0 0 0 0 1 1 1 0
0 0 0 0 0 0 0 0 0
0 0 0 0 0 0 0 0 0
0 0 0 0 0 0 0 0 0
```
MOUNTAIN
```
0 0 0 0 0 0 0 0 0
0 0 0 0 0 0 0 0 0
0 0 0 0 0 0 0 0 0
0 0 0 0 0 0 0 0 0
0 0 0 0 0 0 0 0 0
0 0 0 0 0 0 0 0 0
0 0 0 0 0 0 0 0 0
0 0 0 0 0 0 0 0 0
0 0 0 0 0 0 0 0 0
0 0 0 0 0 0 0 0 0
```
FIELD
FIG.7B

CORRESPONDING

3×3 VICINITY

SAMPLE FEATURE VECTOR (CORRESPONDING CLASS: FIELD)

WINNER VECTOR

CORRESPONDING (CORRESPONDING CLASS OF WINNER VECTOR) = (FIELD)

3×3 VICINITY

SAMPLE FEATURE VECTOR (CORRESPONDING CLASS: FIELD)

⇕ CORRESPONDING (CORRESPONDING CLASS OF WINNER VECTOR) = (MOUNTAIN)

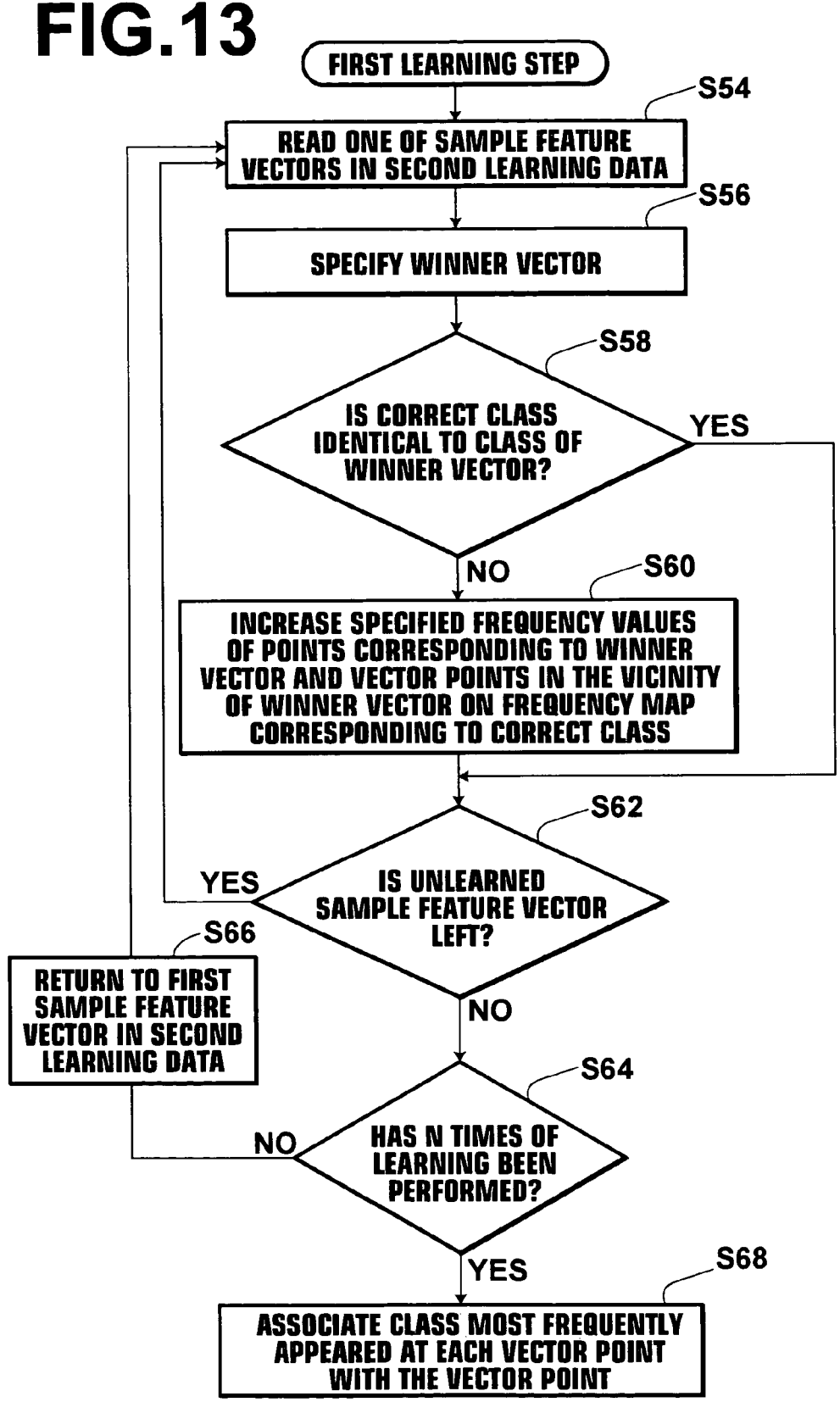

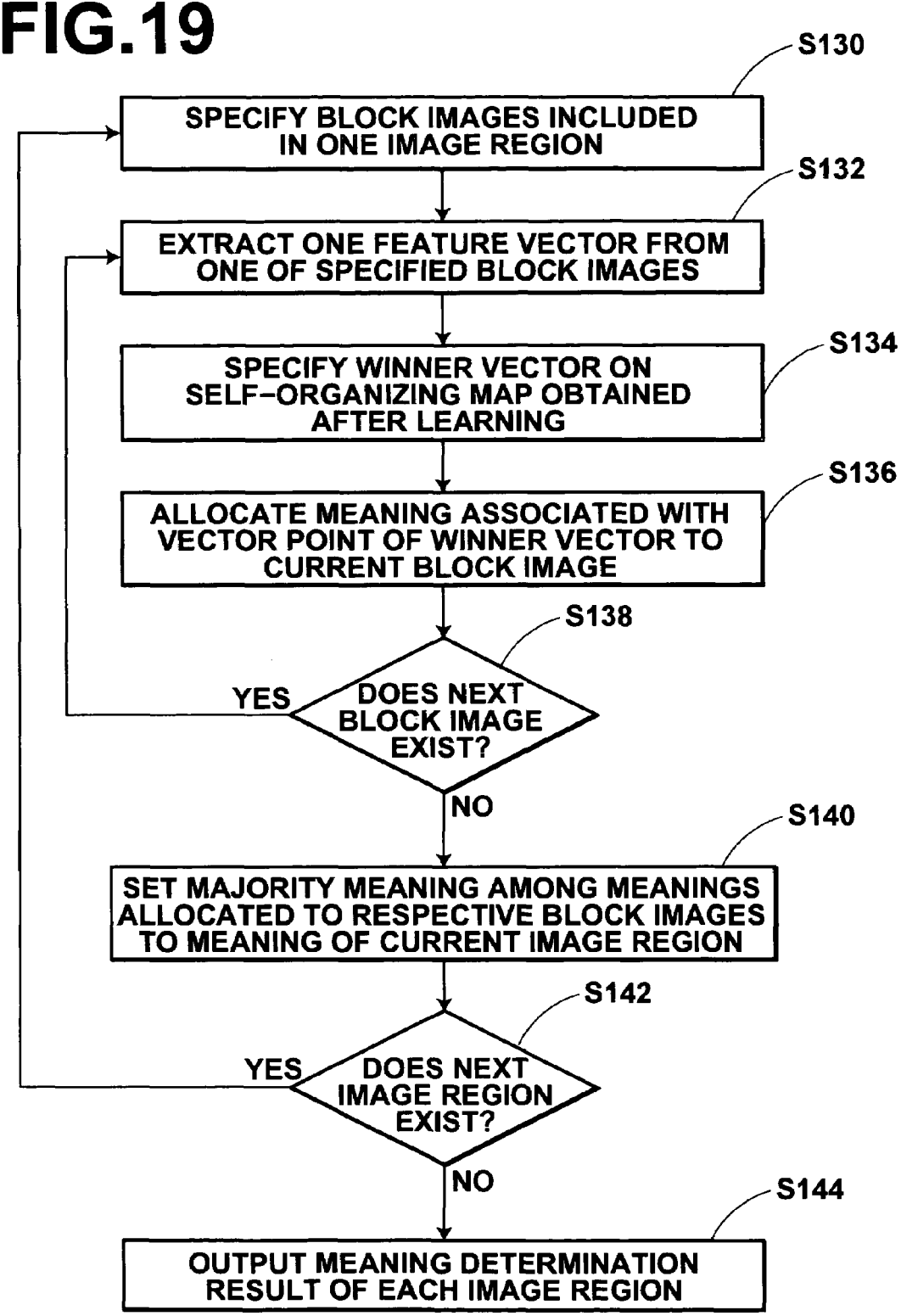

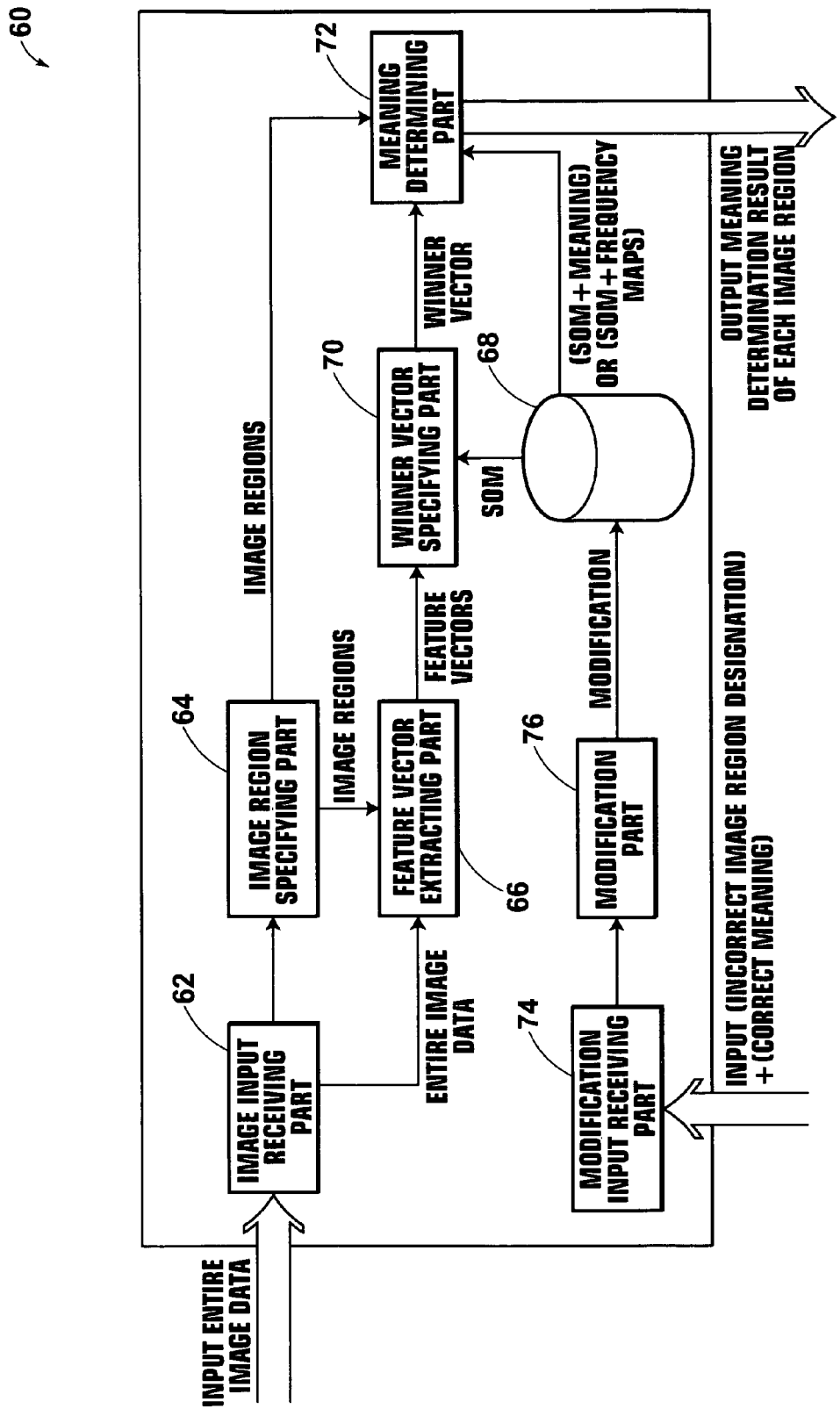

SELF-ORGANIZING MAP OBTAINED AFTER LEARNING BASED ON MODIFIED COUNTERPROPAGATION

MAP OF CORRESPONDING CLASSES

APPARATUS, PROGRAM, AND RECORDING MEDIUM FOR LEARNING DATA TO FORM A SELF-ORGANIZING MAP COMPRISED OF REFERENCE VECTORS CORRESPONDING TO FEATURES OF AN IMAGE AND USED FOR DETERMINING OBJECTS IN AN IMAGE

BACKGROUND OF THE INVENTION

1. Field of the Invention

The present invention relates to a data learning apparatus, a data learning program and a computer-readable recording medium carrying a data learning program. More specifically, the present invention relates to an apparatus, a program and a computer-readable recording medium for learning data by supervised learning for deriving a self-organizing map to be used in processing of determining contents of information such as determination of a meaning of an image. Moreover, the present invention also relates to an apparatus for determining a meaning of a target image or an image region by use of a self-organizing map.

2. Description of the Related Art

As a method for sorting information into classes, for searching information and the like, a method utilizing a self-organizing map has recently started to be used as an alternative to a conventional clustering method and the like.

The self-organizing map is a map in which a plurality of multidimensional vectors are spatially arranged. Each of the multidimensional vectors is a vector having as components a plurality of parameters each indicating one feature of reference data (hereinafter referred to as a "reference feature vector") On this self-organizing map, preliminary learning of many pieces of sample data allows reference feature vectors similar to each other to be arranged at positions close to each other.

Generally, learning described above is "unsupervised learning." This learning is performed by repeating the following steps. First, an initial self-organizing map is prepared, in which a plurality of random reference feature vectors are distributed. Thereafter, a feature vector as a learning target is read and a winner vector having the highest similarity to the feature vector is retrieved from the reference feature vectors on the self-organizing map. Subsequently, the winner vector and the reference feature vectors distributed in the vicinity of the winner vector are modified so as to increase the similarity thereof to the feature vector as the learning target. By use of the self-organizing map obtained after performing the unsupervised learning, as to many pieces of input information, a winner vector having the highest similarity to vectors indicating features of the respective pieces of input information can be searched for on the self-organizing map. Thereafter, the respective pieces of input information can be mapped in a position of the winner vector on the self-organizing map. Thus, display of information listed in a two-dimensional map or the like is made possible (for example, see Japanese Unexamined Patent Publication Nos. 2002-41545 and 2001-337953). In such a list display, information having similar features (for example, similar images, similar product information and the like) are arranged close to each other and displayed. Thus, it is easy to capture the information visually and to browse the information. Moreover, there has also been proposed a method for classifying or prioritizing input information in the following manner (for example, see Japanese Unexamined Patent Publication Nos. 2001-306612 and 2001-283184). In the self-organizing map obtained after performing the unsupervised learning, a plurality of island-shaped regions, in which vectors having particularly strong similarity are gathered, are defined as clusters. Accordingly, it is checked which one of the clusters a winner vector belongs to, the winner vector having the highest similarity to a vector indicating features of input information.

For the purpose of classification or display of information, it is only necessary to use a self-organizing map obtained by the unsupervised learning described above. However, in order to apply the map to content determining processing (class determining processing) for information, it is necessary that respective vector points on a self-organizing map obtained after learning are each associated with contents (classes) of information. For this, there has also been proposed a method of "modified counterpropagation (MCP)" or the like, in which "supervised learning" and the self-organizing map are combined together (for example, see Tokutaka et al., "Application of Self-Organizing Maps—Two-Dimensional Visualization of Multidimensional Information," Kaibundo, 1999, pp. 1-19, 63-75). Specifically, in the supervised learning, data to be learned is previously divided into classes and it is known which one of the classes respective pieces of data belong to. In a learning step by use of this modified counterpropagation method, "frequency maps" having the same size as the self-organizing map are prepared for the respective classes. Accordingly, along with learning of the self-organizing map, the frequency map is created for each of the classes. The frequency map shows a frequency of appearance of winner vectors for feature vectors as learning targets, which belong to the class, at each of vector points or in the vicinity thereof on the self-organizing map. Thus, after the learning is finished, obtained are: a self-organizing map in which reference feature vectors similar to each other are arranged in positions close to each other; and a map of corresponding classes, showing information about the class most frequently appearing at each vector point on the self-organizing map. Therefore, by use of the self-organizing map obtained after the learning, a winner vector having the highest similarity to a vector indicating features of input information can be searched for on the self-organizing map and a corresponding point of a vector point of the winner vector on the map of corresponding classes can be referred to. Thus, it is made possible to determine which one of the classes the input information belongs to.

Meanwhile, as another method which can be used for processing such as searching and sorting of information into classes and for information content determining processing, there has also been proposed a method using a learning result obtained by a learning method called learning vector quantization (LVQ) which is, again, the supervised learning (for example, see the above document (Tokutaka); and Yahagi et al., "Neural Network and Fuzzy Signal Processing," Corona Publishing Co., Ltd., 1998, pp. 41-47). In the learning method based on this learning vector quantization, learning is performed by repeating the following steps. First, a reference feature vector group including a plurality of reference feature vectors of which corresponding classes are known is prepared. Thereafter, a feature vector as a learning target, of which corresponding class is also known, is sequentially read and a winner vector having the highest similarity to the feature vector as the learning target is retrieved from the reference feature vector group. Accordingly, when a corresponding class associated with the winner vector is identical to a corresponding class associated with the feature vector as the learning target, the winner vector is modified so as to increase the similarity to the feature vector as the learning target. On the other hand, when the two corresponding classes are not identical to each other, the winner vector is modified so as to decrease the similarity to the feature vector as the learning target. By use of the reference feature vector group obtained after the learning, a winner vector having the highest similarity to a vector indicating features of input information can be retrieved from the reference feature vector group and a class associated with the winner vector can be referred to. Thus, it is made possible to determine which one of the classes the input information belongs to. This learning vector quantization is similar to the above-described learning method using the self-organizing map based on the modified counterpropagation in that the learning vector quantization is the data learning method based on the supervised learning using the feature vectors. However, the learning vector quantization is different from the learning method using the self-organizing map at the point that there is no spatial interaction in learning by the reference feature vector group. Specifically, as described above, in the learning method using the self-organizing map, conceptually, the reference feature vectors are spatially arranged on the self-organizing map and each step of learning affects not only the winner vector but also reference feature vectors distributed in the vicinity of the winner vector. However, in the method based on the learning vector quantization, the vectors are not spatially arranged within the reference feature vector group and vicinity learning is not performed.

As described above, by use of the self-organizing map obtained after learning, in which the respective vector points and the contents (classes) of information are associated with each other, the information content determining processing can be performed. As the data learning method for deriving the self-organizing map, the method based on the modified counterpropagation has been proposed. However, in the information content determining processing using the self-organizing map obtained after learning by this method, an erroneous determination is likely to occur particularly when a reference feature vector specified as a winner vector is a reference feature vector near a boundary between classes. For example, assume that a number of feature vectors known to belong to any of classes A, B and C are learned by use of the modified counterpropagation method and, as a result, a self-organizing map and a map of corresponding classes as schematically shown in FIG. 26 are obtained. On the self-organizing map obtained after learning, the reference feature vectors similar to each other are arranged in the positions close to each other as described above. However, the similarity between reference feature vectors within a region corresponding to each class tends to be particularly high in the vicinity of the center of each region and low in the vicinity of a boundary between classes. Therefore, for example, considered is a case where a winner vector for a vector expressing features of input information as a target of the content (class) determining processing is a reference feature vector in the vicinity of the center of a region corresponding to the class B, such as the vector $V_1$ shown in FIG. 26. In this case, reliability of a determined result that "the class of the input information is B" is relatively high. However, when the winner vector is a reference feature vector in the vicinity of the boundary between classes, such as the vector $V_2$, the reliability of the determined result is low and accuracy of the content determining processing is limited. This means that the accuracy is also lowered in meaning determination for an image in which feature vectors indicating features of an image, of which meaning is known, are learned and meaning determining processing for the image is performed. Besides the above, in the learning method based on the modified counterpropagation, learning contents at a stage before a self-organizing map is converged, that is, at an early learning stage where reference feature vectors on the map are still in a random state are reflected in a final self-organizing map. The above fact also becomes a factor for lowering the accuracy of later content determining processing. In particular, for example, when the number of learning samples is small, the accuracy is more likely to be lowered.

Meanwhile, in the learning vector quantization method that is another learning method applicable to the information content determining processing, as described above, it is necessary to prepare a reference feature vector group beforehand by selecting a suitable number of initial reference feature vectors for each of the classes. In the learning vector quantization, it is particularly important how to decide component values of these initial reference feature vectors and "the suitable number" for each of the classes. This is because of the following reason. In the learning vector quantization, the concept of the vicinity learning is not adopted unlike the learning method using the self-organizing map and the respective reference feature vectors are subjected to learning independently of each other (that is, modified independently). Thus, "the suitable number" of the reference feature vectors for each class, which is initially decided, remains throughout the learning. Moreover, depending on how to decide the initial component values, reference feature vectors on which no learning is performed or learning is hardly performed may exist. However, in reality, it is not easy to suitably decide the component values of the initial reference feature vectors and "the suitable number" for each class. As a result, the above fact becomes a factor for limited accuracy in the content determining processing using a learning result based on the learning vector quantization.

SUMMARY OF THE INVENTION

In consideration for the foregoing circumstances, an object of the present invention is to make it possible to derive a self-organizing map capable of performing information content determining processing such as image meaning determination with higher accuracy in an apparatus, a program and a computer-readable recording medium for data learning using a self-organizing map. In addition, another object of the present invention is to perform image meaning determining processing that is one mode of the information content determining processing with higher accuracy by use of a self-organizing map.

Specifically, a first data learning apparatus according to the present invention includes: first learning means for deriving a temporary self-organizing map in which classes are associated with respective vector points of reference feature vectors by learning first learning data including a plurality of first sample feature vectors for each of which a corresponding class is known; and second learning means for modifying the temporary self-organizing map and deriving a final self-organizing map by learning second learning data including a plurality of second sample feature vectors for each of which a corresponding class is known; wherein the second learning means includes: second vector specifying means for reading one of the second sample feature vectors out of the second learning data and specifying a second learning winner vector on the temporary self-organizing map which has the highest similarity to the one of the second sample feature vectors; modification means for comparing a class associated with a vector point of the second learning winner vector to a corresponding class of the one of the second sample feature vectors indicated by the second learning data and, when the class associated with the vector point of the second learning winner vector is not identical to the corresponding class indicated by the second learning data, modifying the second learning winner vector and a plurality of reference feature vectors distributed in a second learning vicinity of the second learning winner vector on the temporary self-organizing map so as to reduce the similarity thereof to the one of the second sample feature vectors; and means for deriving the final self-organizing map by operating each of the second vector specifying means and the modification means once or repeatedly more than once for each of the plurality of second sample feature vectors.

In the first data learning apparatus according to the present invention described above, the modification means described above may be one that further modifies the second learning winner vector and the plurality of reference feature vectors distributed in the second learning vicinity so as to increase the similarity thereof to the one of the second sample feature vectors, when the class associated with the vector point of the second learning winner vector is identical to the corresponding class of the one of the second sample feature vectors indicated by the second learning data.

Here, "the feature vector" in the present invention means a vector having as components a plurality of parameters indicating features of certain data (hereinafter referred to as "feature quantities"). For example, when a learning target is a piece of image data, usable as feature quantities constituting components of one feature vector includes feature quantities indicating the following features of one image: color features; luminance features; distance information; features of edges included in the image; features of a correlation between change patterns of luminance values and the like along respective pixel rows and columns which are included in the image; and the like. Moreover, "the reference feature vectors" mean feature vectors distributed in the respective vector points on the self-organizing map, and "the sample feature vector" means a feature vector as a learning sample. Furthermore, for distinction, the sample feature vector used in the first learning step or means is called "the first sample feature vector" and the sample feature vector used in the second learning step or means is called "the second sample feature vector" when necessary.

Moreover, in the present invention, "the similarity" means an indicator of a degree of similarity between feature vectors. For example, a Euclidean distance or an inner product between two feature vectors in a feature vector space can be used. Note that an expression that the similarity is "high" or "low" does not mean that a value of the similarity is large or small. For example, in the case of adopting the above-described Euclidean distance as the similarity, the two vectors are similar to each other when a value of the similarity (that is the Euclidean distance) is smaller. Thus, this means that "the similarity is high."

Furthermore, in the present invention, "the winner vector" means a reference feature vector which has, among reference feature vectors distributed on a self-organizing map, the highest similarity to a sample feature vector as a learning target or to a feature vector as a classification target after learning. Note that, for distinction, a winner vector having the highest similarity to the first sample feature vector is called "the first learning winner vector" and a winner vector having the highest similarity to the second sample feature vector is called "the second learning winner vector" when necessary.

Moreover, in the present invention, "the vicinity" on the self-organizing map means a region in the vicinity of the winner vector, the region being influenced by effects of learning on the self-organizing map. For example, a vicinity region of n×n (n is an odd number of 3 or more) which has the winner vector as its center, a substantially circular vicinity region and the like can be adopted. Note that "the first learning vicinity" used for distinction means vicinity used in the first learning step or means, and "the second learning vicinity" means vicinity used in the second learning step or means. For any of the first learning vicinity and the second learning vicinity, a vicinity of the same size may be used throughout the learning. Alternatively, a size of the vicinity to be influenced by the effects of the learning may be reduced as the learning proceeds.

A second data learning apparatus according to the present invention includes: first learning means for deriving a temporary self-organizing map in which classes are associated with respective vector points of reference feature vectors by learning first learning data including a plurality of first sample feature vectors for each of which a corresponding class is known; and second learning means for modifying the temporary self-organizing map and deriving a final self-organizing map by learning second learning data including a plurality of second sample feature vectors for each of which a corresponding class is known; wherein the second learning means includes: second vector specifying means for reading one of the second sample feature vectors out of the second learning data and specifying a second learning winner vector having the highest similarity to the one of the second sample feature vectors among the reference feature vectors on the temporary self-organizing map of which the vector points are associated with a class that is identical to a corresponding class of the one of the second sample feature vectors indicated by the second learning data; modification means for modifying the second learning winner vector and a plurality of reference feature vectors distributed in a second learning vicinity of the second learning winner vector on the temporary self-organizing map so as to increase the similarity thereof to the one of the second sample feature vectors; and means for deriving the final self-organizing map by operating each of the second vector specifying means and the modification means once or repeatedly more than once for each of the plurality of second sample feature vectors.

In the first and second data learning apparatuses according to the present invention described above, the first learning means may be one using a method of modified counterpropagation. Specifically, the first learning means of the first and second data learning apparatuses according to the present invention may be one which includes: means for generating an initial self-organizing map in which a plurality of random reference feature vectors are distributed; means for generating a plurality of frequency maps, on which initial values of specified frequency values allocated to respective points are zero, each of the frequency maps corresponding to one class; first vector specifying means for reading one of first sample feature vectors out of the first learning data and specifying a first learning winner vector on the initial self-organizing map which has the highest similarity to the one of the first sample feature vectors; update means for modifying the first learning winner vector and a plurality of reference feature vectors distributed in a first learning vicinity of the first learning winner vector on the initial self-organizing map so as to increase the similarity thereof to the one of the first sample feature vectors, and for increasing the specified frequency values in points corresponding to respective vector points of the first learning winner vector and the plurality of reference feature vectors distributed in the first learning vicinity on a frequency map corresponding to a corresponding class of the one of the first sample feature vectors indicated by the first learning data; means for deriving the temporary self-organizing map by operating each of the first vector specifying means and the update means once or repeatedly more than once for each of the plurality of first sample feature vectors; and means for defining a class which is most likely to appear at each vector point on the temporary self-organizing map as the class associated with the vector point by referring to the plurality of frequency maps.

Here, in the present invention, "the specified frequency values" mean values allocated to the respective points on the frequency map provided for each class. The specified frequency value is a value indicating how often the reference feature vector corresponding to that point on the self-organizing map or the reference feature vectors in the vicinity thereof are specified as the winner vectors for the sample feature vectors corresponding to the class. That is, the higher specified frequency value a point on a frequency map of a certain class has after learning, the more likely a reference feature vector on the self-organizing map corresponding to that point represents features of that class. This specified frequency value may be a value of the above-described specified frequency itself or may be a value obtained by standardizing the above-described specified frequency or the like. Moreover, "the frequency map" described above may be one which has the same size as the self-organizing map and defines specified frequency values corresponding one-to-one with respective vector points on the self-organizing map. Alternatively, the frequency map may be one having lower resolution than the self-organizing map. For example, assuming that the length and breadth of each frequency map are half of those of the self-organizing map, the same specified frequency value may be allocated to each set of 2×2 vector points on the self-organizing map.

A third data learning apparatus according to the present invention includes: first learning means for deriving a self-organizing map and a plurality of frequency maps, each of which corresponds to one class, by learning first learning data including a plurality of first sample feature vectors for each of which a corresponding class is known; and second learning means for modifying the plurality of frequency maps and deciding final classes associated with respective vector points on the self-organizing map by learning second learning data including a plurality of second sample feature vectors for each of which a corresponding class is known; wherein the second learning means includes: second vector specifying means for reading one of the second sample feature vectors in the second learning data and specifying a second learning winner vector on the self-organizing map which has the highest similarity to the one of the second sample feature vectors; modification means for performing modification of increasing a specified frequency value of a corresponding point corresponding to a vector point of the second learning winner vector or specified frequency values of the corresponding point and points distributed in a vicinity thereof on a frequency map corresponding to a correct class which is the same as a corresponding class of the one of the second sample feature vectors indicated by the second learning data among the plurality of frequency maps; means for operating each of the second vector specifying means and the modification means once or repeatedly more than once for each of the plurality of second sample feature vectors; and means for defining a class which is most likely to appear at each vector point on the self-organizing map as a final class associated with the vector point by referring to the plurality of frequency maps.

Here, the above-described modification means of the third data learning apparatus according to the present invention may be one which performs the aforementioned modification only in either one of cases where a class associated with a frequency map showing the highest specified frequency value at a point corresponding to a vector point of the second learning winner vector specified by a preceding operation of the second vector specifying means and a corresponding class of the one of the second sample feature vectors indicated by the second learning data are identical and not identical to each other.

A fourth data learning apparatus according to the present invention includes: first learning means for deriving a self-organizing map and a plurality of frequency maps, each of which corresponds to one class, by learning first learning data including a plurality of first sample feature vectors for each of which a corresponding class is known; and second learning means for modifying the plurality of frequency maps and deciding final classes associated with respective vector points on the self-organizing map by learning second learning data including a plurality of second sample feature vectors for each of which a corresponding class is known; wherein the second learning means includes: second vector specifying means for reading one of the second sample feature vectors out of the second learning data and specifying a second learning winner vector on the self-organizing map which has the highest similarity to the one of the second sample feature vectors; modification means for performing modification of decreasing a specified frequency value of a corresponding point corresponding to a vector point of the second learning winner vector or specified frequency values of the corresponding point and points distributed in a vicinity thereof on some of or all of the frequency maps except for a frequency map corresponding to a correct class which is the same as a corresponding class of the one of the second sample feature vectors indicated by the second learning data among the plurality of frequency maps; means for operating each of the second vector specifying means and the modification means once or repeatedly more than once for each of the plurality of second sample feature vectors; and means for defining a class which is most likely to appear at each vector point on the self-organizing map as a final class associated with the vector point by referring to the plurality of frequency maps.

Here, the above-described modification means of the fourth data learning apparatus according to the present invention may be one that further performs modification of increasing a specified frequency value of a corresponding point corresponding to a vector point of the second learning winner vector or specified frequency values of the corresponding point and points distributed in a vicinity thereof on a frequency map corresponding to the correct class.

Moreover, the above-described modification means of the fourth data learning apparatus according to the present invention may be one that performs the modification only in either one of cases where a class associated with a frequency map showing the highest specified frequency value at a point corresponding to a vector point of the second learning winner vector specified by a preceding operation of the second vector specifying means and a corresponding class of the one of the second sample feature vectors indicated by the second learning data are identical and are not identical to each other.

Also in the third and fourth data learning apparatuses according to the present invention described above, the first learning means may be one using a method of modified counterpropagation. Specifically, the first learning means of the third and fourth data learning apparatuses according to the present invention may be one which includes: means for generating an initial self-organizing map on which a plurality of random reference feature vectors are distributed; means for generating a plurality of frequency maps, in which initial values of specified frequency values allocated to respective points are zero, each of the frequency maps corresponding to one class; first vector specifying means for reading one of first sample feature vectors out of the first learning data and specifying a first learning winner vector on the initial self-organizing map which has the highest similarity to the one of the first sample feature vectors; update means for modifying the first learning winner vector and a plurality of reference feature vectors distributed in a vicinity of the first learning winner vector on the initial self-organizing map so as to increase the similarity thereof to the one of the first sample feature vectors, and for increasing the specified frequency values in points corresponding to respective vector points of the first learning winner vector and the plurality of reference feature vectors distributed in the vicinity on a frequency map corresponding to a corresponding class of the one of the first sample feature vectors indicated by the first learning data; and means for operating each of the first vector specifying means and the update means once or repeatedly more than once for each of the plurality of first sample feature vectors.

Moreover, in the first to fourth data learning apparatuses according to the present invention described above, each of the plurality of first sample feature vectors and the plurality of second sample feature vectors may be a vector having feature quantities indicating features of an image as components thereof, and each of the corresponding classes indicated by the first learning data and the second learning data may be a class indicating a meaning of an image.

First to fourth data learning programs according to the present invention are programs for making a computer operate as such respective means as those included in the first to fourth data learning apparatuses according to the present invention. First to fourth recording mediums according to the present invention are computer-readable recording mediums carrying such first to fourth data learning programs, respectively.

A first meaning determining apparatus according to the present invention is an apparatus for determining meaning of a target image or an image region by use of a self-organizing map obtained after learning, said self-organizing map having meanings of images associated with respective vector points thereon, including: extraction means for extracting one or a plurality of feature vectors from the target image or the image region; winner vector specifying means for specifying a winner vector on the self-organizing map which has the highest similarity to the feature vector for each of the one or plurality of feature vectors; meaning determining means for determining the meaning of the target image or the image region based on meanings associated with respective vector points of the winner vectors; input means for receiving designation of a target image or an image region of which a correct meaning cannot have been determined by the meaning determining means, and input of the correct meaning of the target image or the image region; and modification means for modifying the self-organizing map by additionally learning the target image or the image region which is designated through the input means, wherein, for each of one or a plurality of feature vectors extracted from the designated target image or image region, the modification means modifies a winner vector having the highest similarity thereof to the feature vector and a plurality of reference feature vectors distributed in a vicinity of the winner vector on the self-organizing map so as to reduce the similarity to the feature vector.

Here, in the present invention, "the target image" as the target for meaning determination may be an entire photographed digital photo image or an entire image equivalent to a whole piece of one frame of a moving picture. Alternatively, the target image may be a partial image included in part of the entire image. In addition, in the present invention, "the image region" means an individual significant region considered to correspond to any of objects such as "sky," "mountain" and "field" in the entire image or the partial image. Moreover, in the present invention, "to determine the meaning" of the target image or the image region includes, for example: to determine into which one of categories such as "a picture of a person, " "a picture of a building" and "a landscape picture of sea" the entire image falls; and to determine to which one of the objects such as "sky," "mountain" and "field" the image region corresponds.

A second meaning determining apparatus according to the present invention is an apparatus for determining meaning of a target image or an image region by use of a self-organizing map obtained after learning, said self-organizing map having meanings of images associated with respective vector points thereon, including: extraction means for extracting one or a plurality of feature vectors from the target image or the image region; winner vector specifying means for specifying a winner vector on the self-organizing map which has the highest similarity to the feature vector for each of the one or plurality of feature vectors; meaning determining means for determining the meaning of the target image or the image region based on meanings associated with respective vector points of the winner vectors; input means for receiving designation of a target image or an image region of which a correct meaning cannot have been determined by the meaning determining means, and input of the correct meaning of the target image or the image region; and modification means for modifying the self-organizing map by additionally learning the target image or the image region which is designated through the input means, wherein, for each of one or a plurality of feature vectors extracted from the designated target image or image region, the modification means re-specifies a winner vector having the highest similarity to the feature vector among reference feature vectors on the self-organizing map of which the vector points are associated with a meaning that is identical to the correct meaning, and modifies the re-specified winner vector and a plurality of reference feature vectors distributed in a vicinity of the re-specified winner vector on the self-organizing map so as to increase the similarity thereof to the feature vector.

A third meaning determining apparatus according to the present invention is an apparatus for determining meanings of a target image or an image region by use of a self-organizing map obtained after learning and a plurality of frequency maps each of which corresponds to one meaning of an image, including: extraction means for extracting one or a plurality of feature vectors from the target image or the image region; vector specifying means for specifying a winner vector on the self-organizing map which has the highest similarity to the feature vector for each of the one or plurality of feature vectors; meaning determining means for determining the meaning of the target image or the image region based on each meaning associated with a frequency map showing the highest specified frequency value at a point corresponding to each of vector points of the winner vectors; input means for receiving designation of a target image or an image region of which a correct meaning cannot have been determined by the meaning determining means, and input of the correct meaning of the target image or the image region; and modification means for modifying the plurality of frequency maps by additionally learning the target image or the image region which is designated through the input means, wherein, for each of one or a plurality of feature vectors extracted from the designated target image or image region, the modification means increases a specified frequency value of a corresponding point corresponding to a vector point of a winner vector having the highest similarity to the feature vector or specified frequency values of the corresponding point and points distributed in a vicinity thereof on a frequency map corresponding to the correct meaning.

A fourth meaning determining apparatus according to the present invention is an apparatus for determining meanings of a target image or an image region by use of a self-organizing map obtained after learning and a plurality of frequency maps each of which corresponds to one meaning of an image, including: extraction means for extracting one or a plurality of feature vectors from the target image or the image region; vector specifying means for specifying a winner vector on the self-organizing map which has the highest similarity to the feature vector for each of the one or plurality of feature vectors; meaning determining means for determining the meaning of the target image or the image region based on each meaning associated with a frequency map showing the highest specified frequency value at a point corresponding to each of vector points of the winner vectors; input means for receiving designation of a target image or an image region of which a correct meaning cannot have been determined by the meaning determining means, and input of the correct meaning of the target image or the image region; and modification means for modifying the plurality of frequency maps by additionally learning the target image or the image region which is designated through the input means, wherein, for each of one or a plurality of feature vectors extracted from the designated target image or image region, the modification means decreases a specified frequency value of a corresponding point corresponding to a vector point of a winner vector having the highest similarity to the feature vector or specified frequency values of the corresponding point and points distributed in a vicinity thereof on some of or all of the frequency maps except for a frequency map corresponding to the correct meaning.

The first and second data learning apparatuses and programs and the first and second computer-readable recording medium according to the present invention are intended to obtain a final self-organizing map in such a manner that a temporary self-organizing map, in which classes are associated with respective vector points, is derived by the first learning means and, thereafter, the above-described temporary self-organizing map, which is already converged to a respectable degree, is set as an initial state of learning by the second learning means and is further modified. Thus, it is made possible to derive a final self-organizing map capable of content determining processing on information with higher accuracy. Moreover, unlike a method such as conventional learning vector quantization in which respective reference feature vectors perform learning independently of each other, an improved method used in the first and second data learning apparatuses and programs and the first and second computer-readable recording medium according to the present invention adopts concept of vicinity learning. Thus, a suitable modification can be added to the temporary self-organizing map without breaking a spatial correlation between the reference feature vectors distributed on the temporary self-organizing map obtained by the first learning means, that is, a characteristic that the reference feature vectors similar to each other are arranged in positions close to each other. Consequently, it is possible to improve accuracy of content determining processing which will be performed later using the final self-organizing map.

Moreover, the third and fourth data learning apparatuses and programs and the third and fourth computer-readable recording medium according to the present invention are intended to modify classes associated with respective vector points on a self-organizing map in such a manner that a self-organizing map and a plurality of frequency maps are derived by the first learning means and, thereafter, the frequency maps corresponding to respective classes are modified by the second learning means without modifying the already converged self-organizing map. Thus, it is again made possible to derive a self-organizing map and frequency maps which can perform content determining processing on information with higher accuracy without breaking a spatial correlation between the reference feature vectors distributed on the self-organizing map obtained by the first learning means.

The meaning determining apparatus for images according to the present invention includes the modification means for additionally learning the target image or the image region, of which meaning cannot be correctly specified. The modification means modifies the self-organizing map or the frequency maps without breaking a spatial correlation between the reference feature vectors distributed on the self-organizing map. Thus, it is possible to gradually improve accuracy of meaning determination in accordance with characteristics of the target image or the image region, which is an actual target for the meaning determination.

BRIEF DESCRIPTION OF THE DRAWINGS

FIG. 1 is a block diagram showing a configuration of a data learning apparatus according to one embodiment of the present invention.

FIG. 2 is a flowchart showing a procedure for a first learning step performed by a first learning section of the data learning apparatus of FIG. 1.

FIGS. 4A and 4B are views showing examples of filters for edge detection which are used for deriving edge images.

FIGS. 7A and 7B are conceptual views showing an example of third repetitive processing in the first learning step of FIG. 2.

FIG. 13 is a flowchart showing a procedure for a third example of the second learning step performed by the second learning section of the data learning apparatus of FIG. 1.

FIG. 19 is a flowchart showing detailed procedures for the meaning determining processing of FIG. 18.

FIG. 20 is a block diagram showing a configuration of a meaning determining apparatus for image regions according to one embodiment of the present invention.

DESCRIPTION OF THE PREFERRED EMBODIMENTS

Figures 3A, 3B:
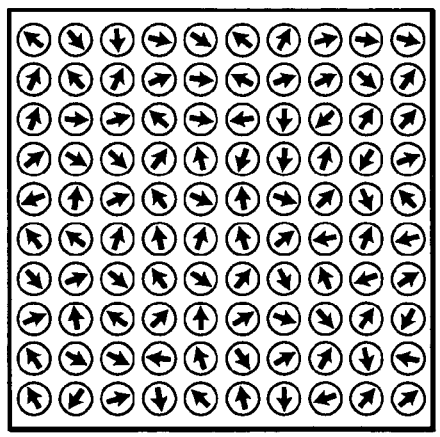
FIGS. 3A and 3B are conceptual views showing a self-organizing map and frequency maps at an initial state of the first learning step of FIG. 2, respectively.

Embodiments to exemplify the present invention will be explained in detail below with reference to the drawings.

FIG. 1 is a block diagram showing a configuration of a data learning apparatus 10 according to one embodiment of the present invention. This data learning apparatus 10 includes: a first learning section 12 which derives, by learning first learning data, a temporary self-organizing map, in which classes are associated with respective vector points, or a combination of the self-organizing map and a plurality of temporary frequency maps; and a second learning section 14 which modifies the self-organizing map or the frequency maps, which are derived by the first learning section 12, by learning second learning data. The first learning section 12 includes: an initial self-organizing map (SOM) generating part 16; an initial frequency map generating part 18; a memory 20 which stores the self-organizing map and the frequency maps; a memory 22 which stores the first learning data; a first vector specifying part 24; an update part 26; and a learning result handover part 28 which hands over a learning result to the second learning section 14. The second learning section 14 includes: a memory 30 which stores a temporary self-organizing map, in which classes are associated with respective vector points, or a combination of the self-organizing map and a plurality of temporary frequency maps; a memory 32 which stores the second learning data; a second vector specifying part 34; and a modification part 36.

A method for data learning processing performed by the foregoing data learning apparatus 10 will be described below with reference to FIGS. 2 to 20. This data learning processing includes a first learning step and a second learning step. The first learning step will be described with reference to FIGS. 2 to 8 and six specific examples of the second learning step will be described with reference to FIGS. 9 to 20.

FIG. 2 is a flowchart showing a procedure for the first learning step performed by the first learning section 12 of the data learning apparatus 10. This first learning step uses a method of modified counterpropagation.

First, in Step S2 of FIG. 2, the initial self-organizing map generating part 16 prepares an initial self-organizing map like the one conceptually shown in FIG. 3A using a random number generation program or the like. In the map, a plurality of random reference feature vectors are distributed. Here, the data learning apparatus 10 according to this embodiment is intended particularly to derive a self-organizing map to be used for meaning determining processing for images. Therefore, the reference feature vectors and sample feature vectors to be used are vectors that have as components feature quantities indicating features of images. In addition, classes corresponding to the sample feature vectors are classes expressing meanings of the images. Specifically, on the initial self-organizing map of FIG. 3A, distributed are ten-dimensional random reference feature vectors each having as components values appropriate for values of ten feature quantities to be described later.

Next, in Step S4, the initial frequency map generating part 18 prepares a frequency map having the same size as the above-described initial self-organizing map for each of the classes, that is, for each of the meanings of the images. Specifically, in the frequency map, zero is allocated as an initial value of specified frequency values at respective points. To prepare a frequency map for each meaning of the image means to prepare a frequency map for each of meanings indicated by corresponding classes of a plurality of sample feature vectors included in first learning data to be learned in the next Step S6 and the subsequent steps. Here, in order to actually derive the self-organizing map to be used for the meaning determining processing for images, it is required in most cases to learn images having various meanings. However, in this embodiment, for simplicity, it is assumed that only an image having any one of meanings among "sky," "mountain" and "field" is learned. Therefore, the frequency maps prepared in Step S4 are only three maps shown in FIG. 3B.

After an initial state of learning is prepared as described above, repetitive processing including Steps S6 to S14 of FIG. 2 is performed. Thus, the first learning data stored in the memory 22 is learned.

First, in Step S6, the first vector specifying part 24 reads from the memory 22 one of the sample feature vectors included in the first learning data as a learning target. In this embodiment, it is assumed that each of the sample feature vectors in the first learning data is a ten-dimensional feature vector including ten feature quantities indicating features of a small image of 32×32 pixels, which is known to be an image of "sky," "mountain" or "field." To be more specific, used as the ten feature quantities are: inter-pixel average value and standard deviation of three component values of the pixels in the small image expressed by the YCC color system; and inter-pixel average value and standard deviation of respective absolute values of pixel values of a vertical edge image and a horizontal edge image which are derived from the small image. The vertical edge image and the horizontal edge image can be obtained by applying such filters for edge detection as shown in FIGS. 4A and 4B to each small image of luminance components in the YCC color system. The first learning data also includes information about the classes corresponding to the respective sample feature vectors, in other words, meanings corresponding thereto.

Next, in Step S8 of FIG. 2, the first vector specifying part 24 searches for a reference feature vector having the highest similarity to the current sample feature vector read in Step S6 on the current initial self-organizing map and specifies that reference feature vector as a winner vector. In this embodiment, a Euclidean distance in a feature vector space is used as the "similarity". Therefore, in Step S8, a reference feature vector having the smallest Euclidean distance from the sample feature vector in the feature vector space is specified as the winner vector.

Subsequently, in Step S10, the update part 26 modifies the winner vector specified in Step S8 and reference feature vectors distributed in 3×3 vector points in the vicinity of the winner vector (the first learning vicinity) on the current self-organizing map so as to increase the similarity thereof to the current sample feature vector, that is, to reduce the Euclidean distance thereof from the current sample feature vector. Next, in Step S12, the update part 26 increases specified frequency values at the points corresponding to the winner vector and its 3×3 vicinity by +1 on a frequency map corresponding to the class (i.e. the meaning) of the current sample feature vector indicated by the first learning data. Thereafter, in Step S14, it is confirmed whether or not unlearned sample feature vectors are left in the first learning data. Accordingly, until learning of all the sample feature vectors in the first learning data is finished, the processing from Step S6 to Step S14 is repeated.

The processing so far will be described in more detail with reference to FIGS. 5 to 7. FIGS. 5 to 7 are conceptual views showing specific processing in the first turn, second turn and third turn of the above-described repetitive processing, respectively.

Figures 5A, 5B:
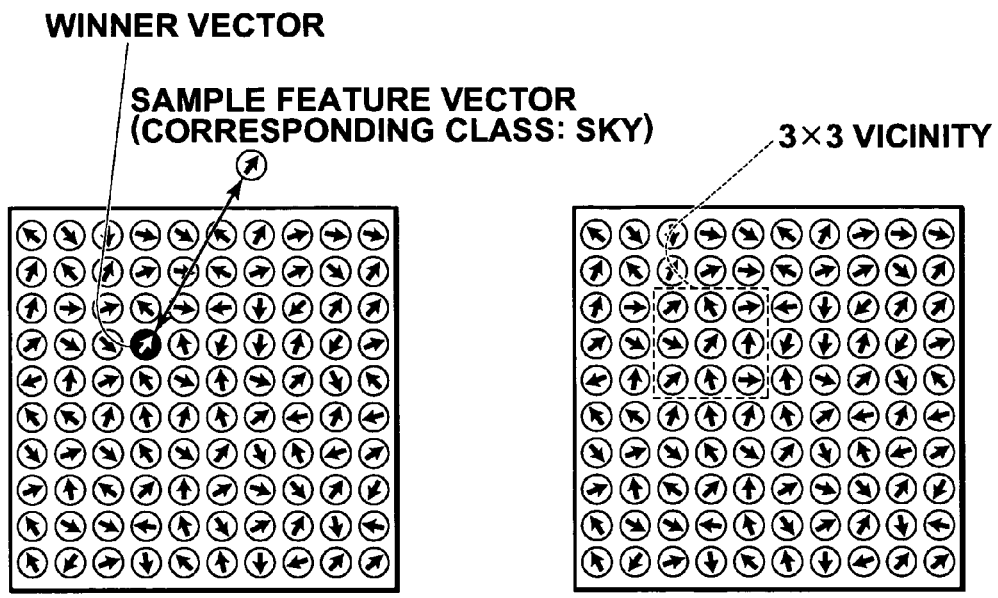
FIGS. 5A and 5B are conceptual views showing an example of first repetitive processing in the first learning step of FIG. 2.

First, it is assumed that a sample feature vector read in Step S6 of the first repetitive processing is a vector of which corresponding class indicated by the first learning data is a meaning of "sky." In addition, it is assumed that, in Step S8, a reference feature vector indicated by a highlighted arrow in FIG. 5A on the left side is specified as a winner vector. Accordingly, as shown in FIG. 5A on the right side, the winner vector and reference feature vectors distributed in vector points in the 3×3 vicinity of the winner vector are modified so as to reduce the Euclidean distance thereof from the sample feature vector shown in FIG. 5A. Furthermore, since the meaning corresponding to the current sample feature vector indicated by the first learning data is "sky," as shown in FIG. 5B, on a frequency map of "sky," specified frequency values of corresponding points of the winner vector and its 3×3 vicinity are increased by +1. For frequency maps of "mountain" and "field," no processing is performed here.

Figures 6A, 6B:
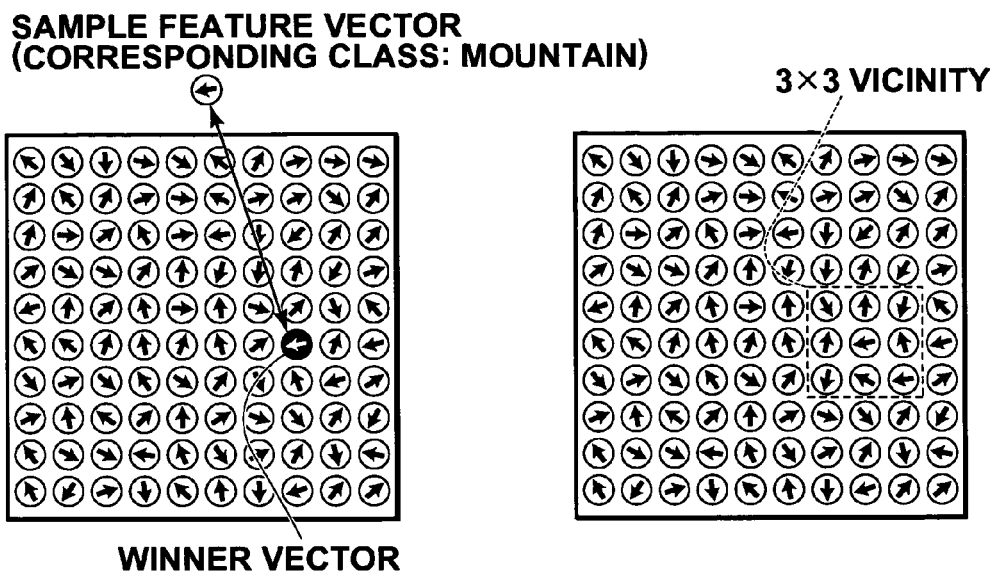
FIGS. 6A and 6B are conceptual views showing an example of second repetitive processing in the first learning step of FIG. 2.

Next, it is assumed that a sample feature vector read in Step S6 of the second repetitive processing is a vector of which corresponding class indicated by the first learning data is a meaning of "mountain." In addition, it is assumed that, in Step S8, a reference feature vector indicated by a highlighted arrow in FIG. 6A on the left side is specified as a winner vector. Accordingly, as shown in FIG. 6A on the right side, the winner vector and reference feature vectors distributed in vector points in the 3×3 vicinity of the winner vector are modified so as to reduce the Euclidean distance thereof from the sample feature vector shown in FIG. 6A. Furthermore, since the meaning corresponding to the current sample feature vector indicated by the first learning data is "mountain," as shown in FIG. 6B, on a frequency map of "mountain," specified frequency values of corresponding points of the winner vector and its 3×3 vicinity are increased by +1.

Subsequently, it is assumed that a sample feature vector read in Step S6 of the third repetitive processing is a vector of which corresponding class indicated by the first learning data is a meaning of "sky." In addition, it is assumed that, in Step S8, a reference feature vector indicated by a highlighted arrow in FIG. 7A on the left side is specified as a winner vector. Accordingly, as shown in FIG. 7A on the right side, the winner vector and reference feature vectors distributed in vector points in the 3×3 vicinity of the winner vector are modified so as to reduce the Euclidean distance thereof from the sample feature vector shown in FIG. 7A. Furthermore, since the meaning corresponding to the current sample feature vector indicated by the first learning data is "sky," as shown in FIG. 7B, on a frequency map of "sky," specified frequency values of corresponding points of the winner vector and its 3×3 vicinity are increased by +1.

As the learning based on the repetitive processing described above proceeds, the initial self-organizing map is gradually converged. Thus, the reference feature vectors indicating similar features gradually gathered in positions close to each other. Meanwhile, on the respective frequency maps, island-shaped frequency distributions are gradually formed.

When the learning of all the sample feature vectors in the first learning data is finished, the processing of FIG. 2 proceeds to Step S16 to confirm whether or not M times of learning are finished. M is a set value of the number of times of repetitive learning for the entire first learning data and may be any positive integer including 1. When M is set to 2 or more and the first learning data is repetitively learned more than once, a temporary self-organizing map which is more properly converged can be obtained.

Figure 8A:
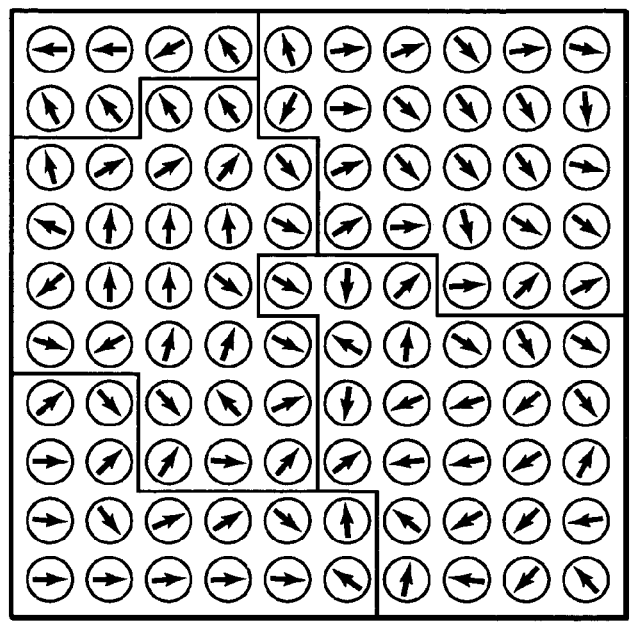
FIGS. 8A and 8B are conceptual views showing a temporary self-organizing map and a meaning map obtained through the first learning step of FIG. 2.

When M times of learning are finished, the processing shown in FIG. 2 proceeds to Step S20. The initial self-organizing map at the time when M times of learning are finished is set to a temporary self-organizing map obtained by the first learning step. FIG. 8A is a conceptual view showing this temporary self-organizing map.

Figure 8B:
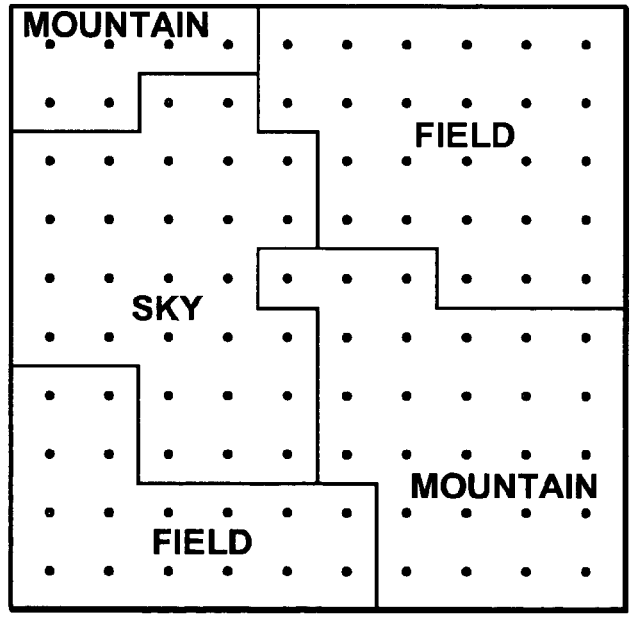

Furthermore, in Step S22, based on the respective frequency maps, the class that has most frequently appeared at each vector point is associated with that vector point. For example, in Step S22, a meaning map as shown in FIG. 8B is first created, in which the respective frequency maps obtained after the learning are standardized and superposed on each other and classes (or meanings) indicating the highest specified frequency values at the respective points are allocated to those points. Then, meanings allocated to corresponding points on the meaning map are associated with the respective vector points on the temporary self-organizing map shown in FIG. 8A. Although it is described above that "the class that has most frequently appeared" at each vector point is associated with that vector point, note that a mode in which a class merely indicating the highest specified frequency value is associated with each vector point without performing standardization of the respective frequency maps also belongs to scope of the present invention.

In the first learning step according to the embodiment described above, the vicinity of a fixed size(the vicinity of the first learning), which is 3×3, is used throughout the learning. Alternatively, however, a large vicinity such as 7×7 may be used in an early stage of the learning and the size of the vicinity may be reduced as the learning proceeds. Moreover, a shape of the vicinity is not limited to a rectangular shape.

Furthermore, in the first learning step according to the embodiment described above, an increment size of the specified frequency values on the respective frequency maps is fixed to +1 throughout the learning. Alternatively, however, the increment size may be increased as the learning proceeds. Moreover, the present invention is not limited to the mode in which the same increment size is applied to the points corresponding to the winner vector and all the reference feature vectors in the first learning vicinity. For example, by adopting increment sizes in a Gaussian-like distribution, points closer to the corresponding point of the winner vector may have a larger increment size.

Figure 9:
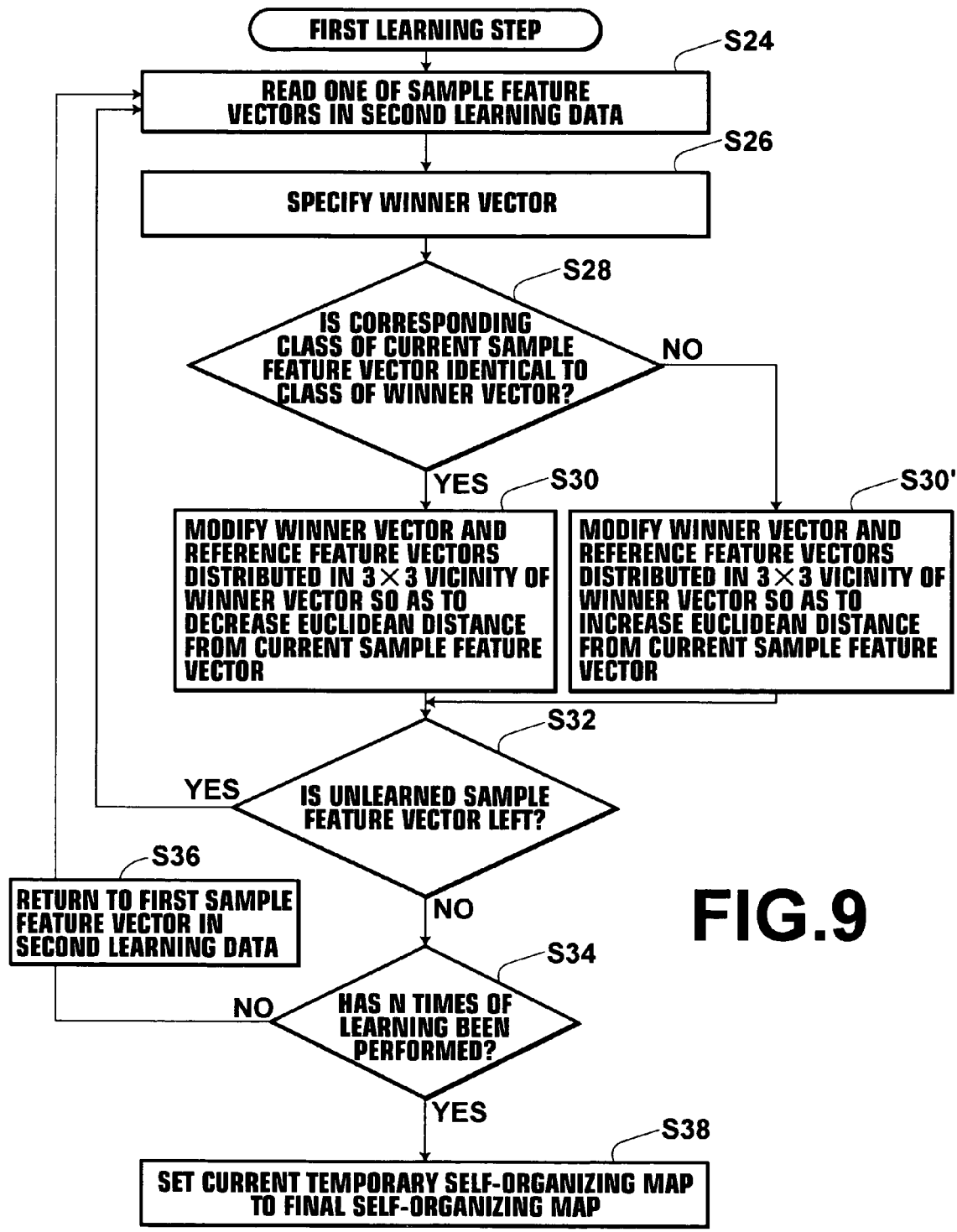
FIG. 9 is a flowchart showing a procedure for a first example of a second learning step performed by a second learning section of the data learning apparatus of FIG. 1.

Subsequently, with reference to FIGS. 9 to 11, a first example of the second learning step performed by the second learning section 14 of the data learning apparatus 10 of this embodiment will be described. FIG. 9 is a flowchart showing a procedure for the first example of the second learning step. For this first example, the temporary self-organizing map shown in FIG. 8A, which is derived through the above-described first learning step, is used as an initial state of learning. Specifically, in the temporary self-organizing map shown in FIG. 8A, meanings are associated with the respective vector points (conceptually speaking, the meaning map shown in FIG. 8B is associated therewith). Prior to start of the second learning step according to this first example, the temporary self-organizing map, in which the above-described meanings are associated with the vectors, is handed over to the second learning section 14 via the learning result handover part 28 of the first learning section 12 and is stored in the memory 30.

First, in Step S24 of the processing of FIG. 9, the second vector specifying part 34 reads, as a learning target, one of sample feature vectors out of the second learning data stored in the memory 32. The same data as the above-described first learning data may be used as this second learning data again. Alternatively, the second learning data may be different from the first learning data as long as the second learning data is one including second sample feature vectors each having as components ten feature quantities similar to those of each of the first sample feature vectors in the first learning data, expressing features of a small image of "sky," "mountain" or "field." The second learning data also includes information about classes corresponding to the respective second sample feature vectors, in other words, meanings corresponding thereto.

Next, in Step S26, the second vector specifying part 34 searches for a reference feature vector having the highest similarity to the current sample feature vector read in Step S24. That is, among the reference feature vectors on the temporary self-organizing map stored in the memory 30, a reference feature vector having the smallest Euclidean distance from the current sample feature vector in a feature vector space is specified as a winner vector.

Subsequently, in Step S28, the modification part 36 confirms whether or not the class corresponding to the current sample feature vector indicated by the second learning data, that is, a correct meaning is identical to a meaning associated with the winner vector specified in Step S26 on the temporary self-organizing map. When the both meanings are identical to each other, in Step S30, the modification part 36 modifies the winner vector and reference feature vectors distributed at the vector points in the 3×3 vicinity of the winner vector on the temporary self-organizing map. Specifically, the above-described modification is performed so as to increase the similarity of those vectors to the current sample feature vector, that is, to reduce the Euclidean distance thereof from the current sample feature vector. On the other hand, when the both meanings are not identical to each other, in Step S30', the modification part 36 modifies the winner vector and the reference feature vectors distributed in the vector points in the 3×3 vicinity of the winner vector on the temporary self-organizing map so as to reduce the similarity thereof to the current sample feature vector, that is, to increase the Euclidean distance thereof from the current sample feature vector. Thereafter, in Step S32, it is confirmed whether or not unlearned sample feature vectors are left in the second learning data. Accordingly, until learning of all the sample feature vectors in the second learning data is finished, the processing from Step S24 to Step S32 is repeated.

The contents of processing actually performed in this repetitive processing will be described more concretely with reference to conceptual views shown in FIGS. 10 and 11.

Figure 10A:
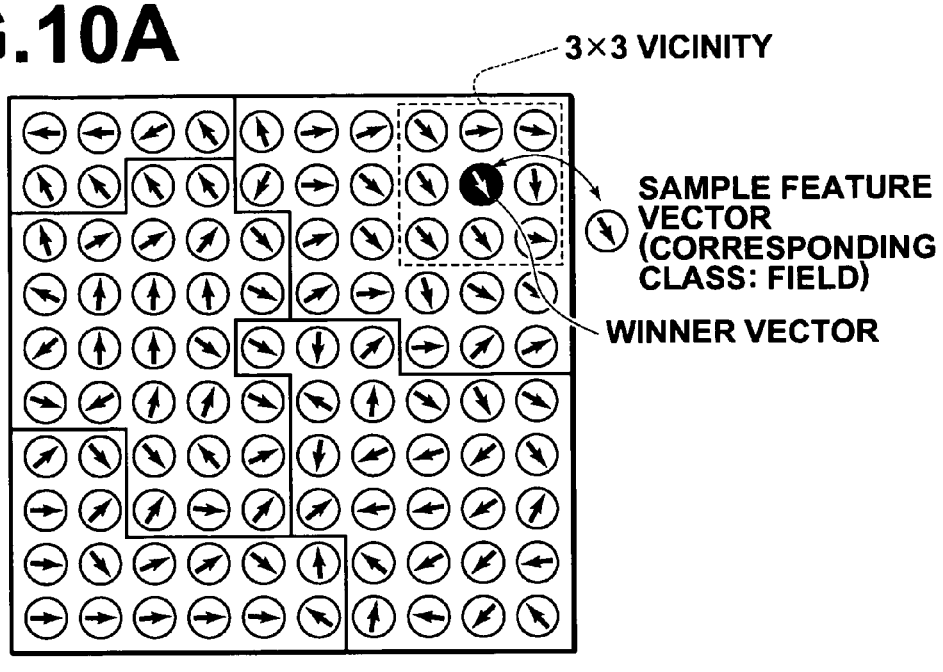
FIGS. 10A and 10B are conceptual views showing an example of one repetitive processing in the first example of the second learning step of FIG. 9.
Figure 10B:
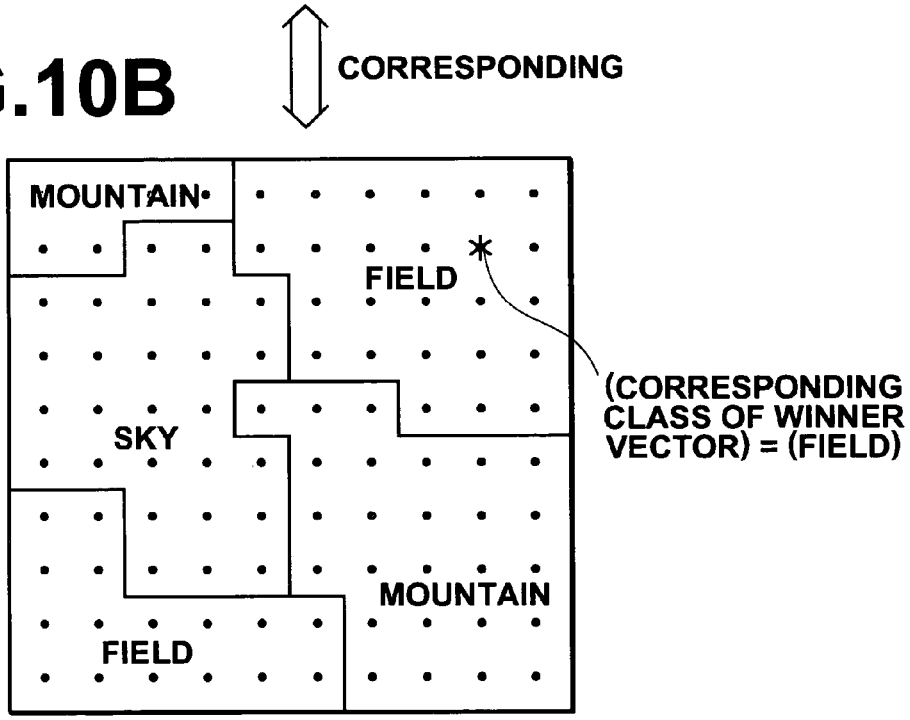

In the conceptual views shown in FIGS. 10A and 10B, it is assumed that a sample feature vector read in Step S24 at a certain turn of repetitive processing is a vector of which corresponding class indicated by the second learning data has a meaning of "field." In addition, it is assumed that, in Step S26, a reference feature vector indicated by a highlighted arrow in FIG. 10A is specified as a winner vector. Accordingly, a point corresponding to the winner vector on a meaning map shown in FIG. 10B, which is the same as that shown in FIG. 8B, is referred to for confirmation in Step S28. Consequently, it is found out that a meaning associated with the winner vector is "field" and the meaning is identical to the correct meaning indicated by the above-described second learning data. Thus, the processing of FIG. 9 proceeds to Step S30 and the winner vector and reference feature vectors distributed in 3×3 vicinity (the vicinity of the second learning) which is indicated by a broken line in FIG. 10A are modified so as to reduce the Euclidean distance thereof from the current sample feature vector. On the meaning map shown in FIG. 10B, no processing such as modification is performed.

Figure 11A:
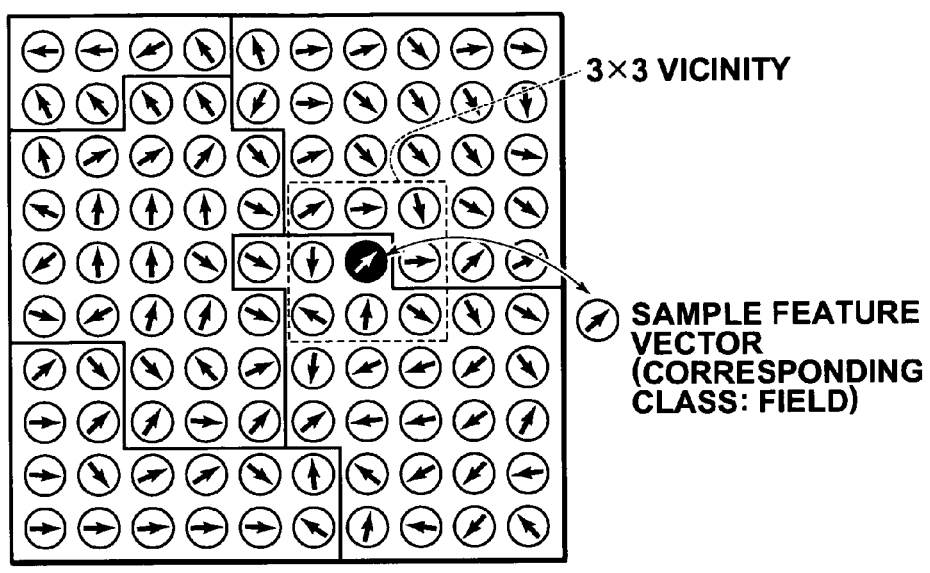
FIGS. 11A and 11B are conceptual views showing an example of another repetitive processing in the first example of the second learning step of FIG. 9.
Figure 11B:
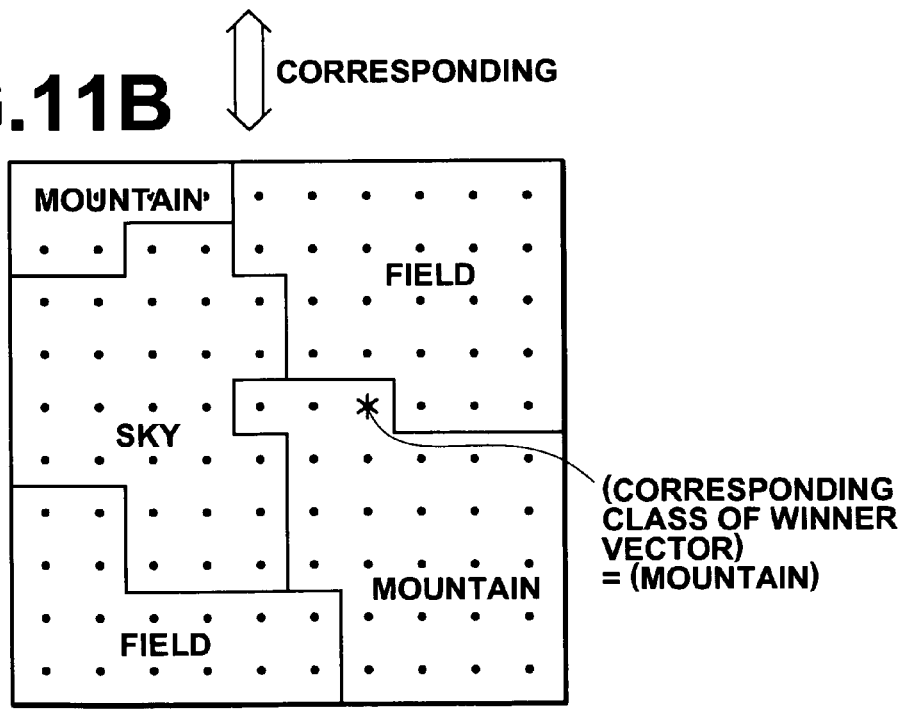

Meanwhile, in the conceptual views shown in FIGS. 11A and 11B, it is assumed that a sample feature vector read in Step S24 at another turn of repetitive processing is a vector of which corresponding class indicated by the second learning data has a meaning of "field." In addition, it is assumed that, in Step S26, a reference feature vector indicated by a highlighted arrow in FIG. 11A is specified as a winner vector. Accordingly, a point corresponding to the winner vector on a meaning map shown in FIG. 11B, which is the same as that shown in FIG. 8B, is referred to for confirmation in Step S28. Consequently, it is found out that a meaning associated with the winner vector is "mountain" and the meaning is not identical to the correct meaning "field" indicated by the second learning data. Such a discrepancy is likely to occur particularly when a reference feature vector near a boundary between classes is specified as the winner vector. Since the meanings are not identical to each other, the processing of FIG. 9 proceeds to Step S30' and the winner vector and reference feature vectors distributed in 3×3 vicinity (the second learning vicinity) which is indicated by a broken line in FIG. 11A are modified so as to increase the Euclidean distance from the current sample feature vector. On the meaning map, no processing such as modification is performed.

As described above, in the first example of the second learning step shown in FIG. 9, by use of a method based on concept of vicinity learning, the temporary self-organizing map is modified. Thus, a suitable modification can be performed without breaking a spatial correlation between the reference feature vectors distributed on the temporary self-organizing map obtained in the first learning step, that is, a characteristic that the reference feature vectors similar to each other are arranged in positions close to each other. Consequently, it is possible to improve accuracy of content determining processing for information (in the case of this embodiment, meaning determining processing for images), which will be performed later using the final self-organizing map.

When the learning of all the sample feature vectors in the second learning data by the repetitive processing is finished, the processing of FIG. 9 proceeds to Step S34 and it is confirmed whether or not N times of learning are finished. N is a set number of times of repetitive learning for the entire second learning data and may be any positive integer including 1.

When N times of learning are finished, the processing shown in FIG. 9 proceeds to Step S38. Accordingly, the temporary self-organizing map stored in the memory 30 at the time when N times of learning are finished is set to a final self-organizing map. With respective vector points on this final self-organizing map, the meanings indicated by the respective corresponding points on the meaning map shown in FIG. 8B are associated.

Note that, in the first example of the second learning step described above, the modification processing is performed in both cases where the class corresponding to the current sample feature vector indicated by the second learning data and the class associated with the winner vector are identical and are not identical to each other. However, the winner vector and the reference feature vectors distributed at the vector points in the vicinity of the winner vector may be modified so as to reduce the similarity thereof to the current sample feature vector only when the two classes are not identical to each other without performing the modification processing when the two classes are identical to each other.

Moreover, in the first example of the second learning step described above, the vicinity of a fixed size (the vicinity of the second learning), which is 3×3, is used throughout the learning. However, a larger vicinity may be used in an early stage of the learning and the size of the vicinity may be reduced as the learning proceeds. Moreover, a shape of the vicinity is not limited to a rectangular shape.

Figure 12:
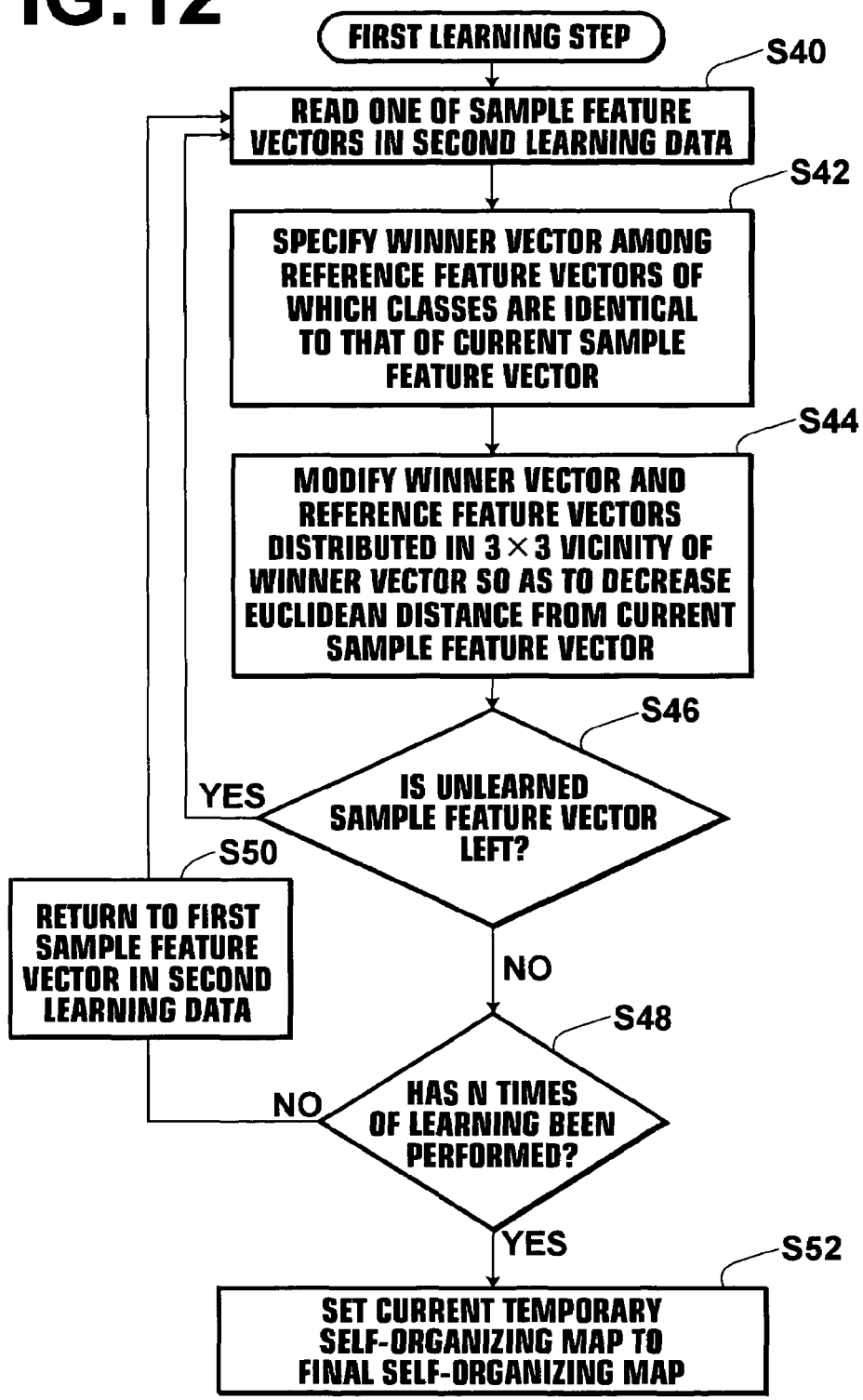
FIG. 12 is a flowchart showing a procedure for a second example of the second learning step performed by the second learning section of the data learning apparatus of FIG. 1.

Next, with reference to FIG. 12, a second example of the second learning step performed by the second learning section 14 of the data learning apparatus 10 of this embodiment will be described. FIG. 12 is a flowchart showing a procedure for the second example of the second learning step. As in the case of the first example described above, this second example is also performed by use of the temporary self-organizing map derived from the above-described first learning step, in which the meanings are associated with the respective vector points, as an initial state of learning. Prior to start of the second learning step according to this second example, the temporary self-organizing map, in which the above-described meanings are associated with the vectors, is handed over to the second learning section 14 via the learning result handover part 28 of the first learning section 12 and is stored in the memory 30.

In the processing of FIG. 12, first, in Step S40, the second vector specifying part 34 reads, as a learning target, one of sample feature vectors out of the second learning data stored in the memory 32. For this second learning data, the same data as the above-described first learning data may be used again or data different from the first learning data may be used. The second learning data also includes information about classes corresponding to the respective second sample feature vectors, in other words, meanings corresponding thereto.

Next, in Step S42, the second vector specifying part 34 searches for and specifies a winner vector on the temporary self-organizing map stored in the memory 30. Here, in the first example described above, the winner vector is searched on the entire temporary self-organizing map. In contrast, in this second example, only those reference feature vectors having corresponding classes identical to that of the current sample feature vector are checked among the reference feature vectors on the entire temporary self-organizing map. Then, a reference feature vector having the highest similarity to the current sample feature vector read in Step S40 among the checked vectors, that is, a reference feature vector having the smallest Euclidean distance from the current sample feature vector in a feature vector space among the checked vectors is specified as the winner vector. For example, if the current sample feature vector is a vector of which correct class (correct meaning) indicated by the second learning data is "field," only the reference feature vectors with which the meaning of "field" is associated on the meaning map shown in FIG. 8B are searched for on the temporary self-organizing map as shown in FIG. 8A. Thereafter, among the searched reference feature vectors, the winner vector is specified.

Subsequently, in Step S44, the modification part 36 modifies the winner vector and reference feature vectors distributed at vector points in the 3×3 vicinity of the winner vector on the temporary self-organizing map. Specifically, the above-described modification is performed so as to increase the similarity of those vectors to the current sample feature vector, that is, to reduce the Euclidean distance from the current sample feature vector. Thereafter, in Step S46, it is confirmed whether or not unlearned sample feature vectors are left in the second learning data. Accordingly, until learning of all the sample feature vectors in the second learning data is finished, the processing from Step S40 to Step S46 is repeated.

As described above, also in the second example of the second learning step shown in FIG. 12, the temporary self-organizing map is modified by use of a method based on concept of vicinity learning. Thus, a suitable modification can be performed without breaking a spatial correlation between the reference feature vectors distributed on the temporary self-organizing map obtained in the first learning step, that is, a characteristic that the reference feature vectors similar to each other are arranged in positions close to each other. Consequently, it is possible to improve accuracy of content determining processing for information (in the case of this embodiment, meaning determining processing for images), which will be performed later using the final self-organizing map.

When the learning of all the sample feature vectors in the second learning data by the repetitive processing is finished, the processing of FIG. 12 proceeds to Step S48 and it is confirmed whether or not N times of learning are finished. N is a set number of times of repetitive learning for the entire second learning data and may be any positive integer including 1.

When N times of learning are finished, the processing shown in FIG. 12 proceeds to Step S52. Accordingly, the temporary self-organizing map stored in the memory 30 at the time when N times of learning are finished is set to a final self-organizing map. With respective vector points on this final self-organizing map, the meanings indicated by the respective corresponding points on the meaning map shown in FIG. 8B are associated.

Note that, in the second example of the second learning step described above, the vicinity of a fixed size (the vicinity of the second learning), which is 3×3, is used throughout the learning. However, a larger vicinity may be used in an early stage of the learning and the size of the vicinity may be reduced as the learning proceeds. Moreover, a shape of the vicinity is not limited to a rectangular shape. Furthermore, for example, when the meaning associated with the winner vector on the meaning map is "field," the shape of the vicinity described above may be changed every time the repetitive processing is performed so as to, for example, restrict the vicinity within a range corresponding to the meaning "field."

Next, with reference to FIGS. 13 and 14, a third example of the second learning step performed by the second learning section 14 of the data learning apparatus 10 of this embodiment will be described. FIG. 13 is a flowchart showing a procedure for the third example of the second learning step. The first learning step prior to the second learning step according to this third example may also be similar to that shown in FIG. 2 described above. However, in this example, the processing of Step S22 is not performed and a learning result of the first learning step is handed over to the second learning section 14 via the learning result handover part 28 of the first learning section 12 and is stored in the memory 30 in a form of a combination of a self-organizing map and a plurality of frequency maps. Values of specified frequency values on each of the frequency maps handed over to the second learning section 14 may be the specified frequency values as they are obtained after the first learning step is finished or may be standardized specified frequency values.

First, in Step S54 of the processing of FIG. 13, the second vector specifying part 34 reads, as a learning target, one of the sample feature vectors out of the second learning data stored in the memory 32. For this second learning data, the same data as the above-described first learning data may be used again or data different from the first learning data may be used. The second learning data also includes information about classes corresponding to the respective second sample feature vectors, in other words, meanings corresponding thereto.

Next, in Step S56, the second vector specifying part 34 searches for a reference feature vector having the highest similarity to the current sample feature vector read in Step S54, that is, a reference feature vector having the smallest Euclidean distance from the current sample feature vector in a feature vector space on the self-organizing map stored in the memory 30, and specifies that reference feature vector as a winner vector.

Subsequently, in Step S58, the modification part 36 confirms whether or not the class corresponding to the current sample feature vector indicated by the second learning data, that is, a correct class is identical to a class associated with the winner vector specified in Step S56. When the two classes are not identical to each other, in Step S60, the modification part 36 increases specified frequency values of a point corresponding to the winner vector and points distributed in its 3×3 vicinity on a frequency map corresponding to the correct class by +1. Thereafter, in Step S62, it is confirmed whether or not unlearned sample feature vectors are left in the second learning data. Accordingly, until learning of all the sample feature vectors in the second learning data is finished, the processing from Step S54 to Step S62 is repeated.

The above-described processing from Step S54 to Step S60 will be described concretely with reference to conceptual views shown in FIGS. 14A and 14B.

Figure 14A:
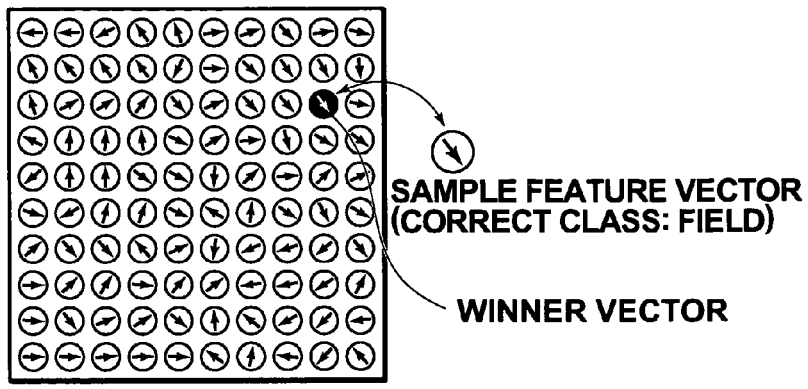
FIGS. 14A and 14B are conceptual views showing an example of modification processing in the third example of the second learning step of FIG. 13.
Figure 14B:
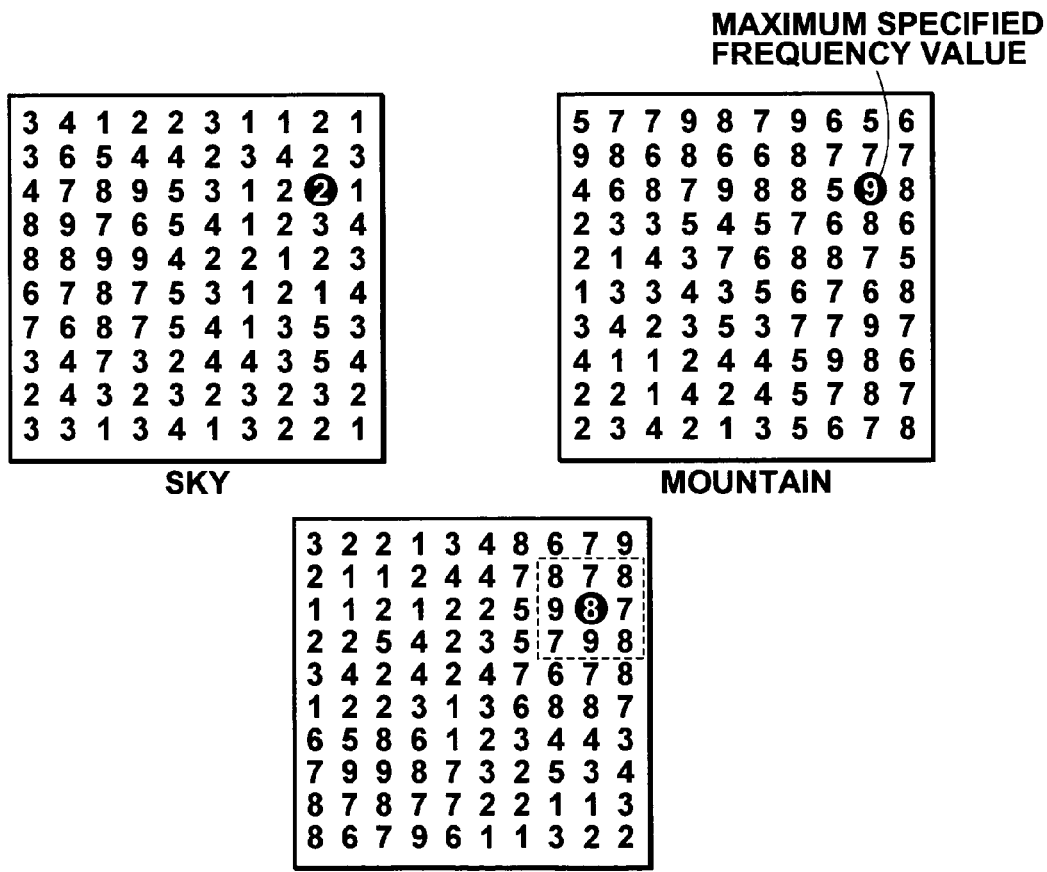

In the conceptual views shown in FIGS. 14A and 14B, it is assumed that the sample feature vector read in Step S54 is a vector of which corresponding class indicated by the second learning data, that is, correct class is a meaning of "field." In addition, it is assumed that, in Step S56, a reference feature vector on a self-organizing map, which is indicated by a highlighted arrow in FIG. 14A, is specified as a winner vector. Accordingly, for confirmation in Step S58, a point corresponding to the winner vector on each of frequency maps shown in FIG. 14B is referred to. Accordingly, the frequency map of "mountain" shows the highest specified frequency value at the point corresponding to the winner vector. Therefore, the class associated with the winner vector is "mountain," which is not identical to the correct class "field." Consequently, in Step S60, on the frequency map corresponding to the correct class "field," specified frequency values of the point corresponding to the winner vector and points distributed in its 3×3 vicinity indicated by a broken line in FIG. 14B are increased by +1.

When the learning of all the sample feature vectors in the second learning data by the repetitive processing is finished, the processing of FIG. 13 proceeds to Step S64 and it is confirmed whether or not N times of learning are finished. N is a set number of times of repetitive learning for the entire second learning data and may be any positive integer including 1.

When N times of learning are finished, the processing shown in FIG. 13 proceeds to Step S68. Accordingly, based on the respective frequency maps stored in the memory 30 at the time when N times of learning are finished, the class that has most frequently appeared at each vector point on the self-organizing map stored in the memory 30 is associated with that vector points.

For example, in Step S68, a meaning map similar to that shown in FIG. 8B is first created, in which the respective frequency maps obtained after the learning are standardized and superposed on each other and classes (or meanings) indicating the highest specified frequency values at the respective points are allocated to those points. Then, meanings allocated to corresponding points on the meaning map are associated with the respective vector points on the self-organizing map stored in the memory 30. Although it is described above that "the class that has most frequently appeared" at each vector point is associated with the vector points, a mode in which a class merely indicating the highest specified frequency value is associated with each vector point without performing standardization of the respective frequency maps also belongs to scope of the present invention.

In the third example of the second learning step described above, the vicinity of a fixed size, which is 3×3, is used throughout the learning. Alternatively, however, a larger vicinity may be used in an early stage of the learning and the size of the vicinity may be reduced as the learning proceeds. Moreover, a shape of the vicinity is not limited to a rectangular shape. Furthermore, in the third example described above, an increment size of the specified frequency values on the respective frequency maps is fixed to +1 throughout the learning. However, the increment size may be increased as the learning proceeds. Moreover, the present invention is not limited to the mode in which the same increment size is applied to the points corresponding to the winner vector and all the reference feature vectors in the vicinity thereof. For example, by adopting increment sizes in a Gaussian-like distribution, points closer to the point corresponding to the winner vector may have a larger increment size. Alternatively, the specified frequency values may be increased only at the point corresponding to the winner vector on the frequency map without performing the vicinity learning.

Moreover, in the example shown in the flowchart of FIG. 13, the modification processing of Step S60 is performed only in the case where the correct class and the class of the winner vector are not identical to each other. However, on the contrary, the modification processing may be performed only in the case where the correct class and the class of the winner vector are identical to each other. Alternatively, the modification processing of Step S60 may be performed regardless of whether or not the correct class and the class of the winner vector is identical to each other, that is, without carrying out a determination step corresponding to Step S58 in the flowchart of FIG. 13.

In either case, in the third example of the second learning step shown in FIG. 13, the frequency maps are modified so that the class associated with the respective vector points on the self-organizing map is modified without modifying the self-organizing map obtained in the first learning step. Thus, a suitable modification can be performed without breaking a spatial correlation between the reference feature vectors distributed on the converged self-organizing map obtained in the first learning step. Consequently, it is possible to improve accuracy of content determining processing for information (in the case of this embodiment, meaning determining processing for images), which will be performed later using the self-organizing map.

Figure 15:
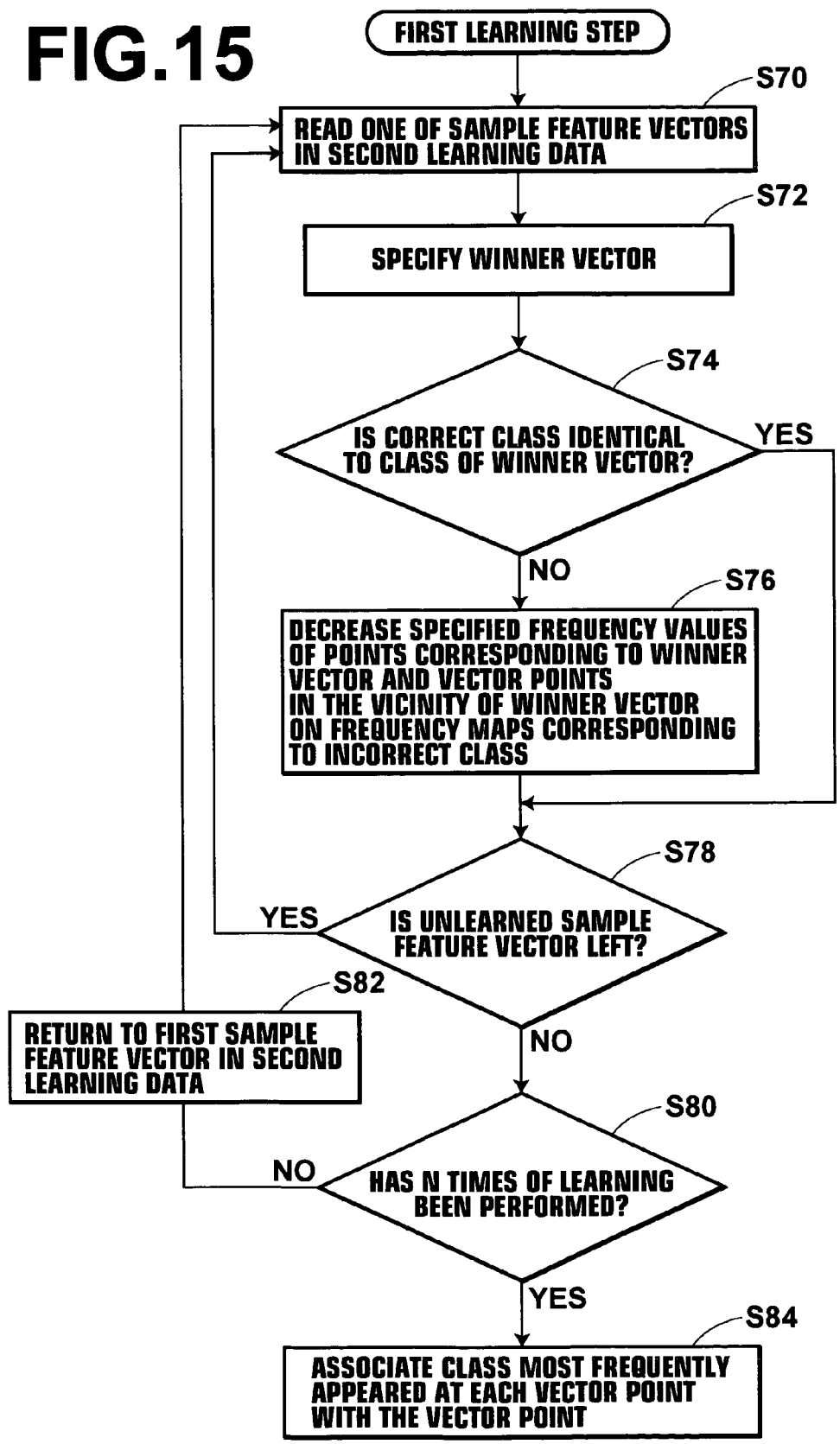
FIG. 15 is a flowchart showing a procedure for a fourth example of the second learning step performed by the second learning section of the data learning apparatus of FIG. 1.

Next, with reference to FIGS. 15 and 16, a fourth example of the second learning step performed by the second learning section 14 of the data learning apparatus 10 of this embodiment will be described. FIG. 15 is a flowchart showing a procedure for the fourth example of the second learning step. In the second learning step according to this fourth example, as in the case of the third example described above, a learning result of the first learning step is handed over to the second learning section 14 via the learning result handover part 28 of the first learning section 12 and is stored in the memory 30 in a form of a combination of a self-organizing map and a plurality of frequency maps. Values of specified frequency values on each of the frequency maps handed over to the second learning section 14 may be the specified frequency values as they are obtained after the first learning step is finished or may be standardized specified frequency values.

First, in Step S70 of the processing of FIG. 15, the second vector specifying part 34 reads, as a learning target, one of the sample feature vectors out of the second learning data stored in the memory 32. For this second learning data, the same data as the above-described first learning data may be used again or data different from the first learning data may be used. The second learning data also includes information about classes corresponding to the respective second sample feature vectors, in other words, meanings corresponding thereto.

Next, in Step S72, the second vector specifying part 34 searches on the self-organizing map stored in the memory 30 for a reference feature vector having the highest similarity to the current sample feature vector read in Step S70, that is, a reference feature vector having the smallest Euclidean distance from the current sample feature vector in a feature vector space, and specifies that reference feature vector as a winner vector.

Subsequently, in Step S74, the modification part 36 confirms whether or not the class corresponding to the current sample feature vector indicated by the second learning data, that is, a correct class is identical to a class associated with the winner vector specified in Step S72. If the two classes are not identical to each other, in Step S76, the modification part 36 reduces specified frequency values of a point corresponding to the winner vector and points distributed in its 3×3 vicinity on each frequency map corresponding to an incorrect class by −1. Thereafter, in Step S78, it is confirmed whether or not unlearned sample feature vectors are left in the second learning data. Accordingly, until learning of all the sample feature vectors in the second learning data is finished, the processing from Step S70 to Step S78 is repeated.

The above-described processing from Step S70 to Step S76 will be described concretely with reference to conceptual views shown in FIGS. 16A and 16B.

Figure 16A:
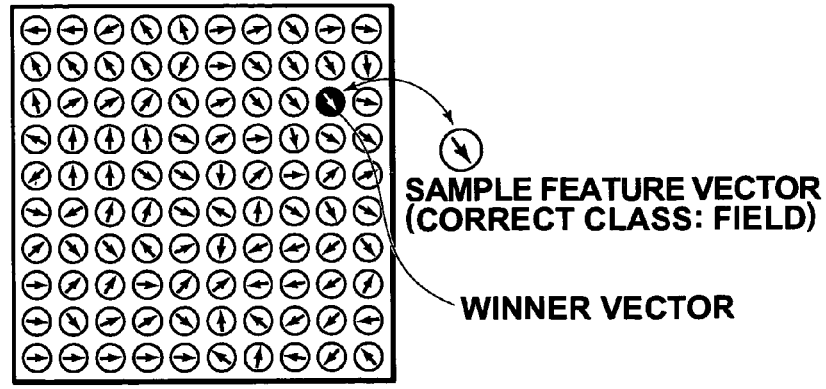
FIGS. 16A and 16B are conceptual views showing an example of modification processing in the fourth example of the second learning step of FIG. 15.
Figure 16B:
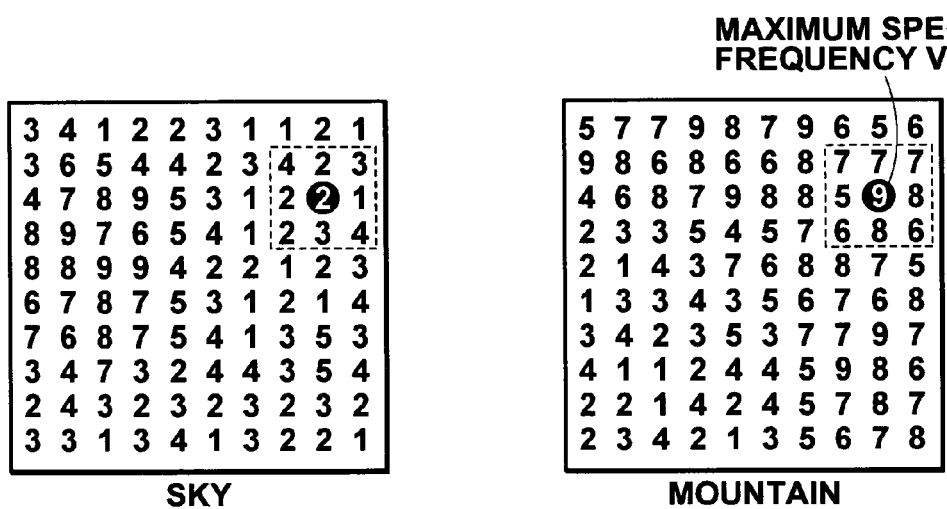

In the conceptual views shown in FIGS. 16A and 16B, it is assumed that the sample feature vector read in Step S70 is a vector of which corresponding class indicated by the second learning data, that is, correct class is a meaning of "field." In addition, it is assumed that, in Step S72, a reference feature vector on a self-organizing map indicated by a highlighted arrow in FIG. 16A is specified as a winner vector. Accordingly, for confirmation in Step S74, a point corresponding to the winner vector on each of frequency maps shown in FIG. 16B is referred to. Accordingly, the frequency map of "mountain" shows the highest specified frequency value at the point corresponding to the winner vector. Therefore, the class associated with the winner vector is "mountain," which is not identical to the correct class "field." Consequently, in Step S76, on each of the frequency maps corresponding to classes other than the correct class "field," in other words, the classes of "sky" and "mountain," specified frequency values of the point corresponding to the winner vector and points distributed in its 3×3 vicinity indicated by a broken line in FIG. 16B are reduced by −1.

When the learning of all the sample feature vectors in the second learning data by the repetitive processing is finished, the processing of FIG. 15 proceeds to Step S80 and it is confirmed whether or not N times of learning are finished. N is a set number of times of repetitive learning for the entire second learning data and may be any positive integer including 1.

When N times of learning are finished, the processing shown in FIG. 15 proceeds to Step S84. Accordingly, based on the respective frequency maps stored in the memory 30 at the time when N times of learning are finished, the class that has most frequently appeared at each vector point on the self-organizing map stored in the memory 30 is associated with that vector points. For example, in Step S84, a meaning map similar to that shown in FIG. 8B is first created, in which the respective frequency maps obtained after the learning are standardized and superposed on each other and classes (or meanings) indicating the highest specified frequency values at the respective points are allocated to those points. Then, meanings allocated to corresponding points on the meaning map are associated with the respective vector points on the self-organizing map stored in the memory 30. Although it is described above that "the class that has most frequently appeared" at each vector point is associated with the vector points, a mode in which a class merely indicating the highest specified frequency value is associated with each vector point without performing standardization of the respective frequency maps also belongs to scope of the present invention.

Note that, in the fourth example of the second learning step described above, as in the case of the third example, a larger vicinity may be used in an early stage of the learning and the size of the vicinity may be reduced as the learning proceeds. Moreover, a shape of the vicinity is not limited to a rectangular shape. Furthermore, a decrement size of the specified frequency values on the respective frequency maps may be increased as the learning proceeds. Moreover, the present invention is not limited to the mode in which the same decrement size is applied to the points corresponding to the winner vector and all the reference feature vectors in the vicinity thereof. For example, by adopting decrement sizes in a Gaussian-like distribution, points closer to the point corresponding to the winner vector may have a larger decrement size. Alternatively, the specified frequency values may be decreased only at the point corresponding to the winner vector on the frequency map without performing the vicinity learning.

Moreover, in the fourth example of the second learning step described above, the modification of decreasing the specified frequency values is performed on all of the frequency maps corresponding to the classes other than the correct class. However, the modification may be performed only on some of the frequency maps corresponding to the classes other than the correct class. For example, in the example described above with reference to FIGS. 16A and 16B, the modification of decreasing the specified frequency values may be performed only on the frequency map of "mountain" showing the highest specified frequency value at the point corresponding to the winner vector.

Furthermore, in the example shown in the flowchart of FIG. 15, the modification processing of Step S76 is performed only in the case where the correct class and the class of the winner vector are not identical to each other. However, on the contrary, the modification processing may be performed only in the case where the correct class and the class of the winner vector are identical to each other. Alternatively, the modification processing of Step S76 may be performed regardless of whether or not the correct class and the class of the winner vector is identical to each other, that is, without carrying out a determination step corresponding to Step S74 in the flowchart of FIG. 15.

Moreover, as the second learning step, one may utilize a step in which the third and fourth examples described above are combined, that is, a step including modification processing in which the specified frequency values are increased on the frequency map corresponding to the correct class and are decreased on the frequency maps corresponding to the classes other than the correct class.

The data learning apparatus according to one embodiment of the present invention and examples of the processing performed by the apparatus have been described above. However, the first learning step performed by the first learning section of the data learning apparatus according to the present invention is not limited to such a one using the above-described method of modified counterpropagation. Thus, utilized in the first learning step may be any other methods as long as it works to obtain a self-organizing map which has classes or frequency maps associated with respective vector points and which is converged to a respectable degree. For example, a method of defining a cluster of vector points covered by respective classes by means of elliptic approximation or the like without creating frequency maps may be used.

Moreover, in the embodiment described above, the Euclidean distance between two feature vectors in the feature vector space is used as the "similarity". However, without being limited thereto, an inner product between two feature vectors or the like may be alternatively used.

Furthermore, the embodiment described above is intended to derive the self-organizing map used for meaning determining processing for images. Therefore, the sample feature vectors and reference feature vectors have had as their components the feature quantities expressing the features of images. In addition, the respective classes have been such ones indicating the meanings of images. However, it is needless to say that the present invention is not limited to the above and can be applied to derivation of a self-organizing map for content determining processing for all sorts of information. Moreover, it is needless to say that, even when the present invention is similarly intended to derive the self-organizing map used for the meaning determining processing for images, the feature quantities used as the components of the sample feature vectors and reference feature vectors are not limited to the above-described ten feature quantities.

Moreover, a program which allows a computer to perform the processing described above is an embodiment of a data learning program according to the present invention. A computer-readable recording medium carrying such a program is an embodiment of a recording medium according to the present invention.

A final self-organizing map derived by the data learning processing including the first learning step and any one of the examples of the second learning step, which are described above, can be used for the meaning determining processing for images. Described below with reference to FIGS. 17 to 19 is a configuration of a meaning determining apparatus which determines meanings of respective image regions included in an input image by use of the self-organizing map and examples of processing performed by the apparatus.

Figure 17:
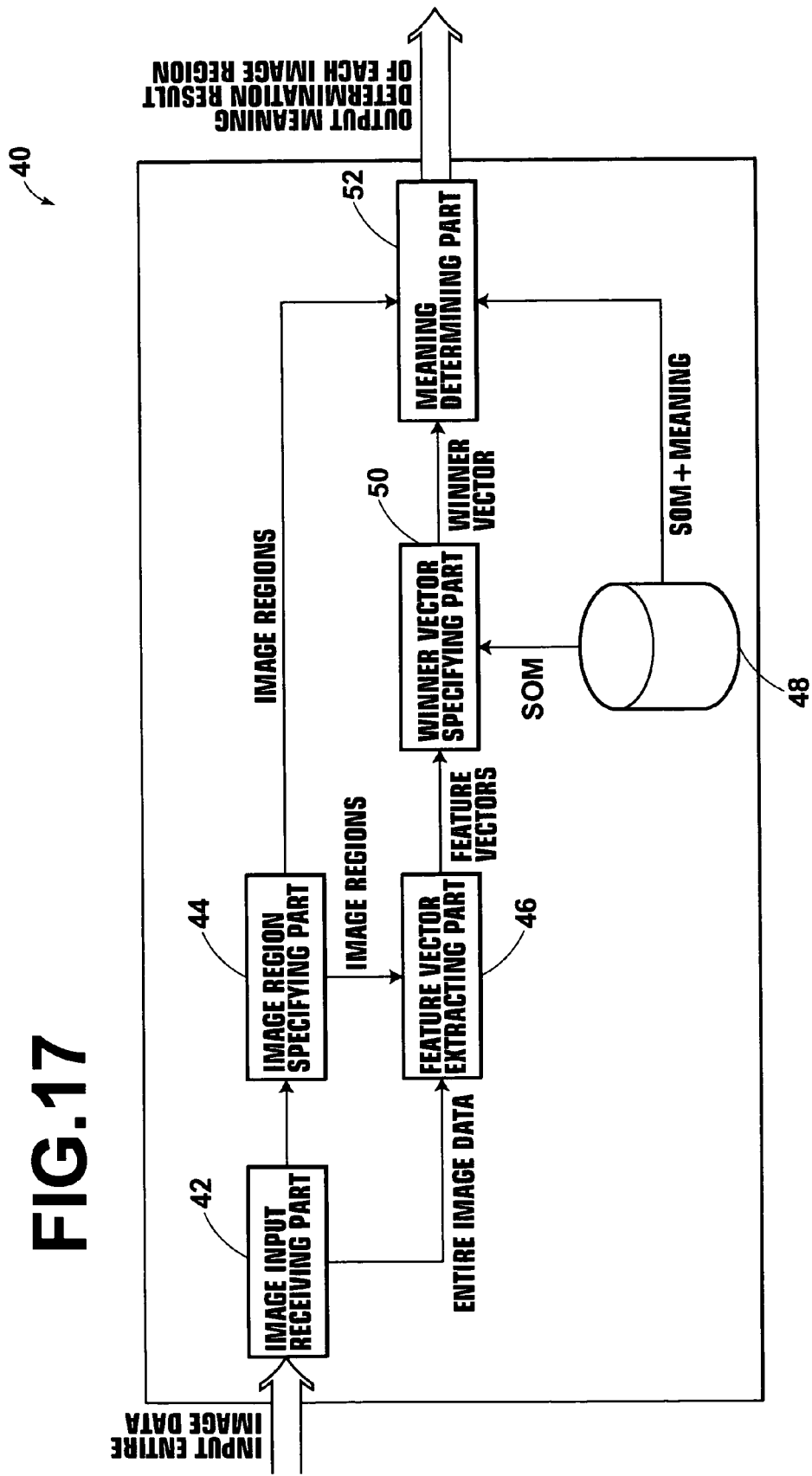
FIG. 17 is a block diagram showing a configuration of a meaning determining apparatus which determines meanings of image regions by use of a self-organizing map derived by the data learning apparatus or a program according to the present invention.

FIG. 17 is a block diagram showing a configuration of a meaning determining apparatus 40. The meaning determining apparatus 40 includes an image input receiving part 42, an image region specifying part 44, a feature vector extracting part 46, a memory 48, a winner vector specifying part 50 and a meaning determining part 52. The memory 48 stores the final self-organizing map derived by the data learning processing including the first learning step and any one of the examples of the second learning step, which are described above. The memory 48 also stores information about a meaning (class) associated with each vector point on the self-organizing map, which is any one of the meanings (classes) "sky," "mountain" and "field".

Figure 18:
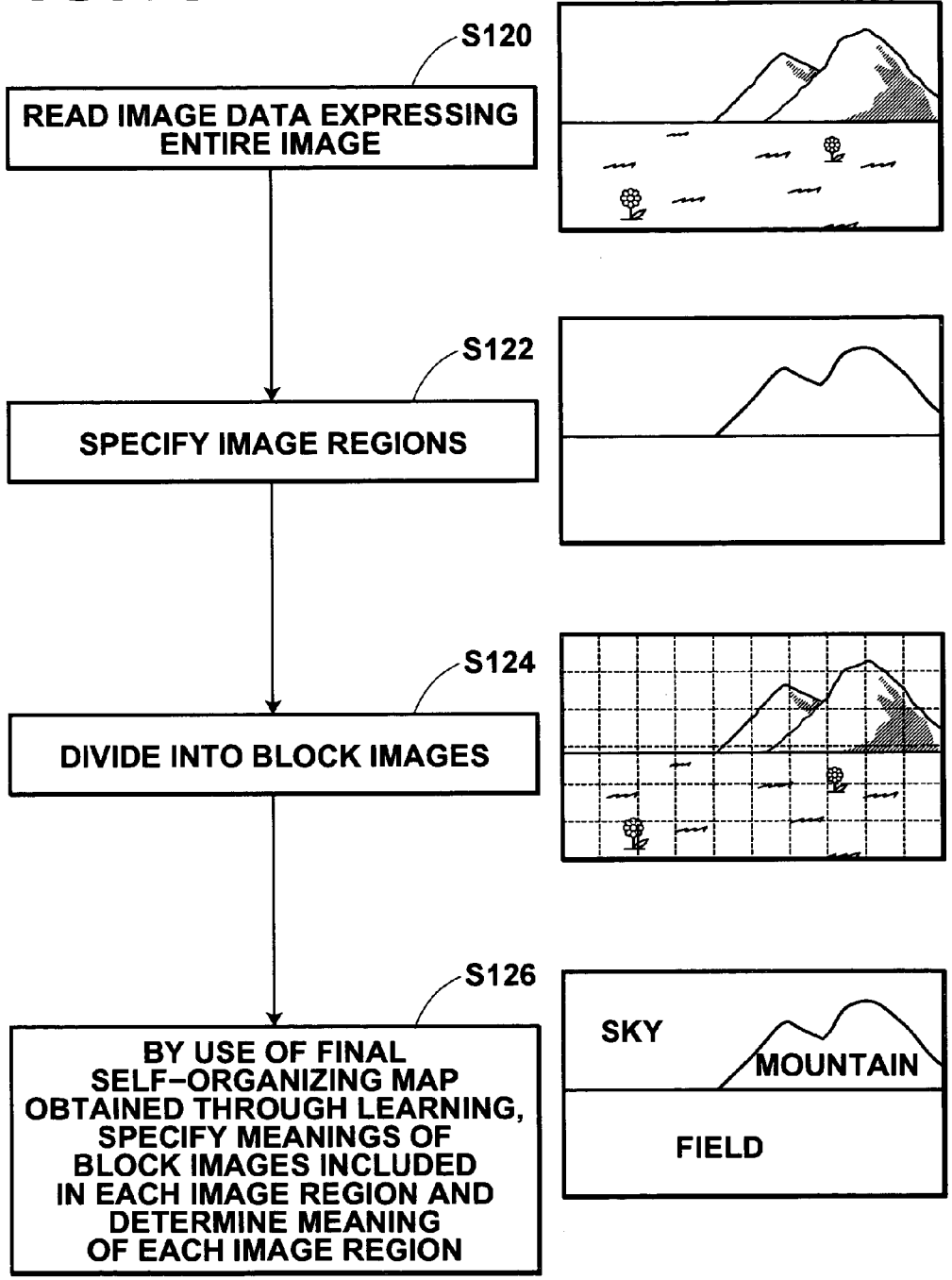
FIG. 18 is a flowchart showing an overall procedure for meaning determining processing performed by the meaning determining apparatus of FIG. 17.

FIG. 18 is a flowchart showing an overall procedure for meaning determining processing for respective image regions included in an input image. The processing of FIG. 18 is useful processing to be followed by image classification based on meanings or image processing under conditions distinguished for each of image regions corresponding to respective meanings.

First, in Step S120, the image input receiving part 42 reads, as input data, image data expressing an entire image. Here, the entire image is assumed to be a digital photo image of 1024× 1280 pixels.

Next, in Step S122, the image region specifying part 44 specifies respective image regions included in the entire image. This specification is performed by taking the following steps or the like. For example, as to the entire image expressed by the RGB color system, color density values of respective components R, G and B are compared between adjacent pixels. When difference between each of the color density values is below a predetermined threshold, processing of integrating the adjacent pixels is performed. Thereafter, the comparison and integration processing is repeated until no more integration occurs according to the above-described predetermined threshold. Moreover, further processing may be performed to integrate minute image regions among the image regions thus obtained, which are considered to be noise or negligible elements, with an image region adjacent thereto. This further integration can be performed, for example, by integrating each minute image region with an adjacent image region having the longest boundary in contact with that minute image region. Note that the above is merely one example of the specification performed by the image region specifying part 44, and thus the specification of the image regions in Step S122 may be performed by use of any other methods.

Subsequently, in Step S124, the feature vector extracting part 46 divides the entire image read in Step S120 into a plurality of block images. Here, each of the block images is an image of 32×32 pixels. Note that, for simplicity, FIG. 18 shows the entire image which is divided more roughly than it actually is.

Next, in Step S126, meanings of the block images included in the respective image regions are specified by use of the self-organizing map stored in the memory 48. Thereafter, based on the result of the specification, meanings of the respective image regions are determined. With reference to a flowchart of FIG. 19, detailed procedures for the processing performed in Step S126 will be described below.

First, in Step S130 of FIG. 19, the feature vector extracting part 46 specifies block images included in one of the plurality of image regions specified in Step S122 of FIG. 18. Here, the block images included in one of the image regions mean those completely included in the image region and do not include those straddling a boundary between the image regions.

Next, in Step S132, the feature vector extracting part 46 extracts a feature vector from one of the block images specified in Step S130. Here, the extracted feature vector is a vector which has, as components, feature quantities of the same sorts as the components of the sample feature vectors learned to derive the self-organizing map used for the meaning determination, in other words, ten feature quantities including inter-pixel average values and standard deviations of three component values of the block image expressed by the YCC color system as well as inter-pixel average values and standard deviations of respective absolute values of component values of a vertical edge image and a horizontal edge image which are derived from the block image.

Subsequently, in Step S134, the winner vector specifying part 50 searches for a reference feature vector having the highest similarity to the feature vector extracted in Step S132 on the self-organizing map stored in the memory 48, and specifies that reference feature vector as a winner vector. Here, the Euclidean distance in the feature vector space, which is similar to that used in the data learning method according to the above-described embodiment, is used as the similarity between the feature vectors. Therefore, a reference feature vector having the smallest Euclidean distance from the feature vector extracted in Step S132 is specified as the winner vector.

Next, in Step S136, the meaning determining part 52 allocates a meaning associated with the vector point of the winner vector specified in Step S134 as a meaning of the current block image referring to the information about meanings stored in the memory 48 (see the meaning map of FIG. 8B).

Subsequently, in Step S138, it is confirmed whether or not any block images included in the current image region are left. Accordingly, until meanings of all of the block images included in the current image region are specified, the processing from Step S132 to Step S138 is repeated. This repetitive processing extracts the feature vectors one by one from the respective block images included in the current image region. Thus, one or a plurality of feature vectors are extracted from the entire current image region, and a winner vector and a corresponding meaning are specified for each of the extracted feature vectors.

When the specification of the meanings of all of the block images included in the current image region is finished, in Step S140, the meaning determining part 52 determines the majority meaning among the specified meanings of the respective block images as a meaning of the current image region. Thereafter, in Step S142, it is confirmed whether or not any image regions are left. Accordingly, until meanings of all of the image regions are determined, the processing from Step S130 to Step S142 is repeated. When the meaning determination for all of the image regions is completed, the meaning determining part 52 outputs determined results in Step S144. In such a manner, when the processing of Step S126 of FIG. 18 is completed, the meanings "sky," "mountain" and "field" are allotted to the respective image regions as shown in FIG. 18.

Note that the meaning determining processing described above is an example. Thus, for example, when the Euclidean distance between the feature vector and the winner vector is larger than a predetermined threshold obtained after Step S134 of FIG. 19, an additional step may be included such as a step of determining "meaning determination disabled" and proceeding to Step S138 without proceeding to Step S136.

Moreover, the above-described meaning determining processing is intended to determine the meanings of the respective image regions included in the inputted entire image. However, it is needless to say that meaning determining processing of the entire image itself or the like can be similarly performed by use of a similar self-organizing map. In that case, the self-organizing map to be used is a final self-organizing map obtained by previously learning entire images each known to be any one of, for example, "a picture of a person," "a picture of a building" and "a landscape picture of sea," by performing the data learning processing including the first and second learning steps described above.

Next, with reference to FIGS. 20 to 25, a meaning determining apparatus for images according to one embodiment of the present invention, which includes modification means for performing additional learning, will be described.

FIG. 20 is a block diagram showing a configuration of a meaning determining apparatus 60 according to this embodiment. The meaning determining apparatus 60 includes an image input receiving part 62, an image region specifying part 64, a feature vector extracting part 66, a memory 68, a winner vector specifying part 70, a meaning determining part 72, a modification input receiving part 74 and a modification part 76. The memory 68 stores a self-organizing map obtained through learning in which meanings (classes) of an image are associated with respective vector points, or a combination of a self-organizing map and a plurality of frequency maps obtained through learning. This self-organizing map or the combination of the self-organizing map and the plurality of frequency maps may be derived by use of any learning method. For example, one derived by use of a similar method to the first learning step (FIG. 2) described above can be used.

The meaning determining apparatus 60 of this embodiment is intended to determine meanings of respective image regions included in an input image. A method of determining the meanings is similar to that of the above-described meaning determining apparatus 40 shown in FIG. 17. In addition, processing performed by the image input receiving part 62, the image region specifying part 64, the feature vector extracting part 66, the winner vector specifying part 70 and meaning determining part 72 is similar to the processing performed by the corresponding parts of the above-described meaning determining apparatus 40. Therefore, configurations and operations of only the modification input receiving part 74 and the modification part 76 will be described below in detail.

In the case where there is any image region of which meaning has not been correctly determined when an operator checks an output of a meaning determination result provided by the meaning determining part 72, the operator can input designation of the image region and a correct meaning to the meaning determining apparatus 60 via the modification input receiving part 74. Based on the input from this modification input receiving part 74, the modification part 76 performs additional learning and modifies the self-organizing map or the frequency maps, which are stored in the memory 68.

Figure 21A:
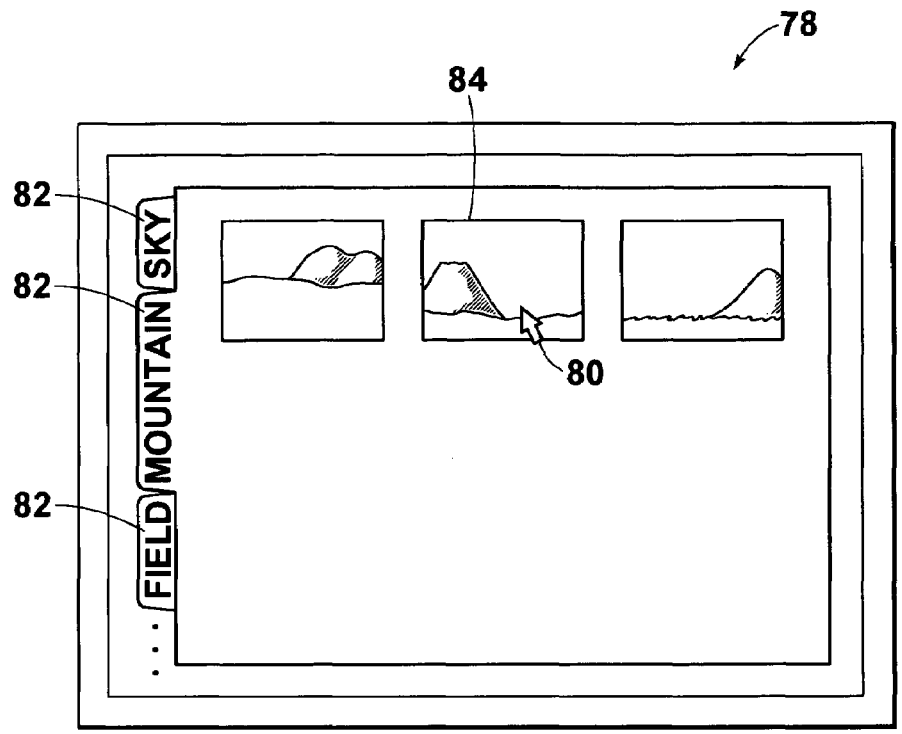
FIGS. 21A and 21B are explanatory views showing a configuration of a modification input receiving part of the meaning determining apparatus of FIG. 20.
Figure 21B:
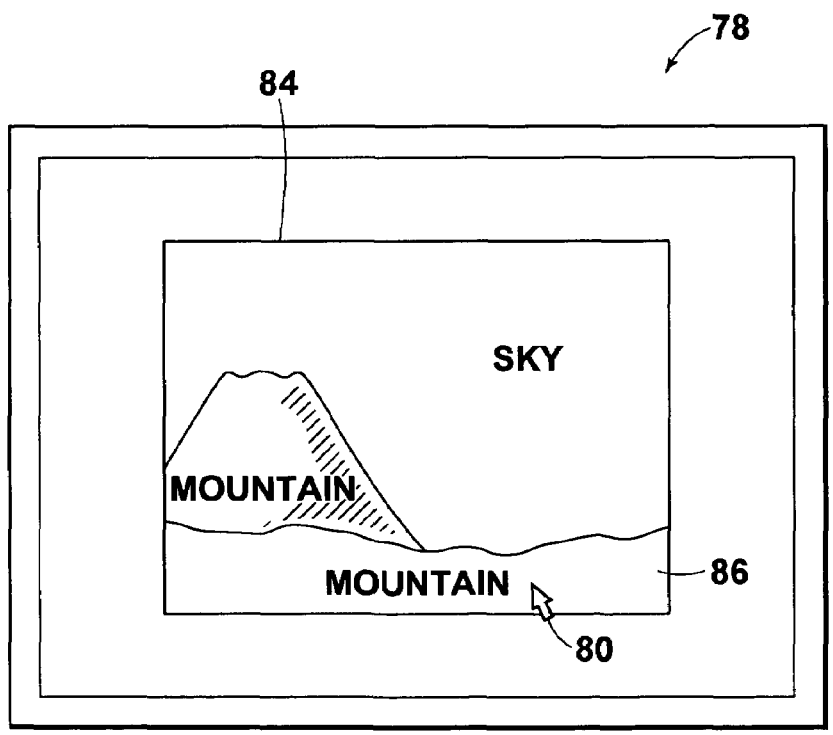

For example, the modification input receiving part 74 may have a configuration including a display part 78 as shown in FIGS. 21A and 21B as an interface. As shown in FIG. 21A, on this display part 78, respective entire images including image regions, which are determined to correspond to a specific meaning by the meaning determining part 72, are displayed for each of meanings such as "sky," "mountain" and "field." The operator can switch display by selecting any one of tabs 82 with a mouse pointer 80. FIG. 21A shows a state where respective entire images including image regions determined to correspond to the meaning of "mountain" are displayed. Here, when one entire image 84 is selected by the mouse pointer 80, as shown in FIG. 21B, the entire image 84 is zoomed and the meanings of the respective image regions, which are determined by the meaning determining part 72, are displayed. In FIG. 21B, an image region 86, whose correct meaning is "field," is erroneously determined to correspond to "mountain." The operator can designate the image region 86 as an image region to be additionally learned by selecting the image region 86 with the mouse pointer 80. After this designation, the operator can input information that a correct meaning of the image region 86 is "field" by means of the mouse pointer 80 or a keyboard.

Now, described below with reference to FIGS. 22 to 25 are first to fourth examples of modification processing performed by the modification part 76 after the above-described input is performed at the modification input receiving part 74.

Figure 22:
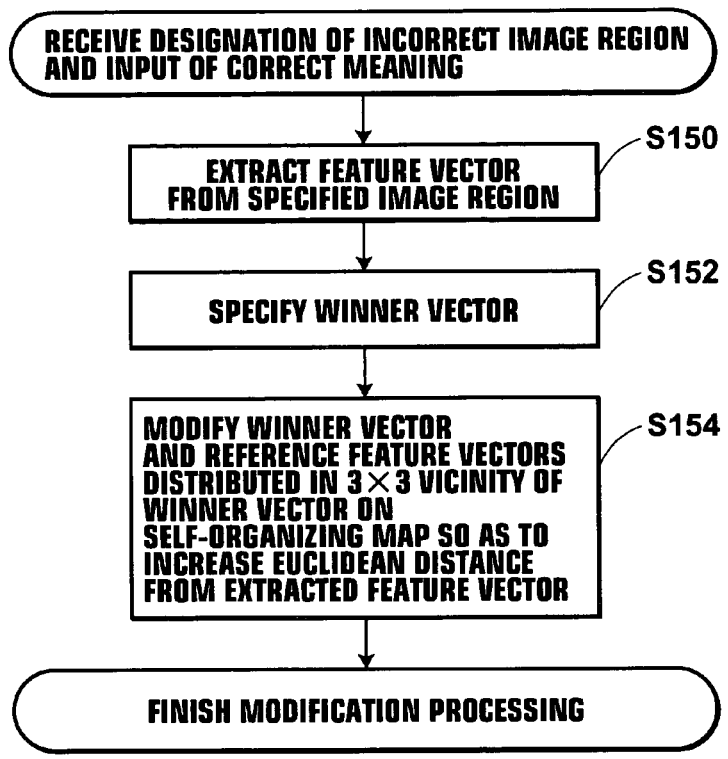
FIG. 22 is a flowchart showing a procedure for a first example of processing performed by a modification part of the meaning determining apparatus of FIG. 20.

The first example of the modification processing shown in FIG. 22 is processing similar to that shown in FIG. 9 as the first example of the second learning step performed by the data learning apparatus according to the above-described one embodiment of the present invention. In this processing of FIG. 22, first, in Step S150, a feature vector is extracted from the image region to be additionally learned, which is designated by the modification input receiving part 74. Next, in Step S152, a reference feature vector having the smallest Euclidean distance from the feature vector extracted in Step S150 in a feature vector space is retrieved from the current self-organizing map stored in the memory 68 and is specified as a winner vector. Lastly, in Step S154, the winner vector specified in Step S152 and reference feature vectors distributed in 3×3 vector points in the vicinity of the winner vector are modified so as to decrease the similarity thereof to the feature vector extracted in Step S150, in other words, to increase the Euclidean distance.

Figure 23:
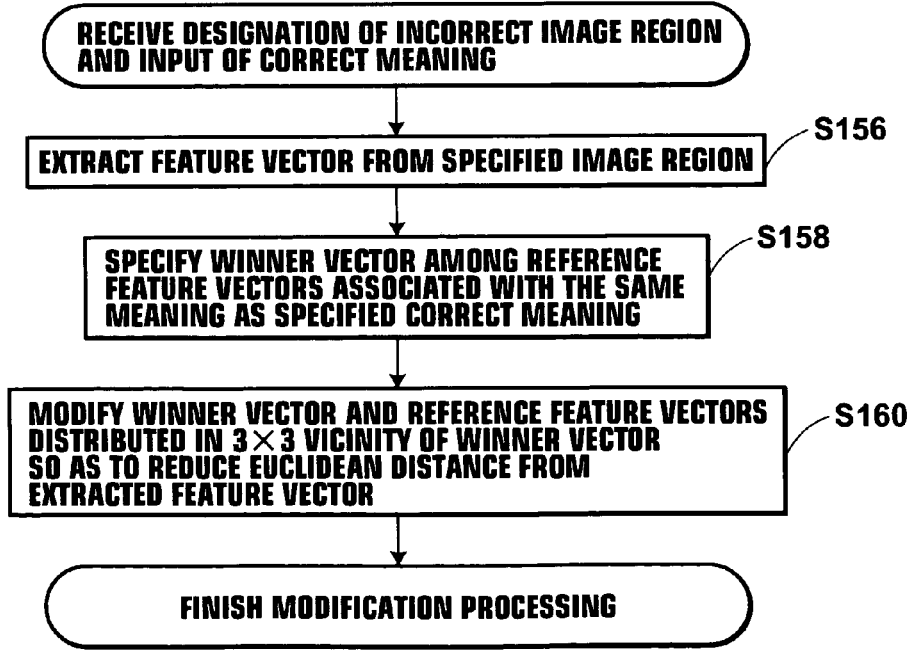
FIG. 23 is a flowchart showing a procedure for a second example of the processing performed by the modification part of the meaning determining apparatus of FIG. 20.

The second example of the modification processing shown in FIG. 23 is processing similar to that shown in FIG. 12 as the second example of the second learning step performed by the data learning apparatus according to the above-described one embodiment of the present invention. In this processing of FIG. 23, first, in Step S156, a feature vector is extracted from the image region to be additionally learned, which is designated by the modification input receiving part 74. Next, in Step S158, a reference feature vector having the smallest Euclidean distance from the feature vector extracted in Step S156 in a feature vector space is selected only among those reference feature vectors associated with the same meaning as the correct meaning designated by the modification input receiving part 74 on the current self-organizing map stored in the memory 68. Thereafter, the selected reference feature vector is specified as a winner vector. Lastly, in Step S160, the winner vector specified in Step S158 and reference feature vectors distributed in 3×3 vector points in the vicinity of the winner vector are modified so as to increase the similarity to the feature vector extracted in Step S156, in other words, to decrease the Euclidean distance.

In the first and second examples of the modification processing described above, used as the vicinity is of a fixed size, which is 3×3. However, the size and shape of the vicinity are not limited thereto.

Figure 24:
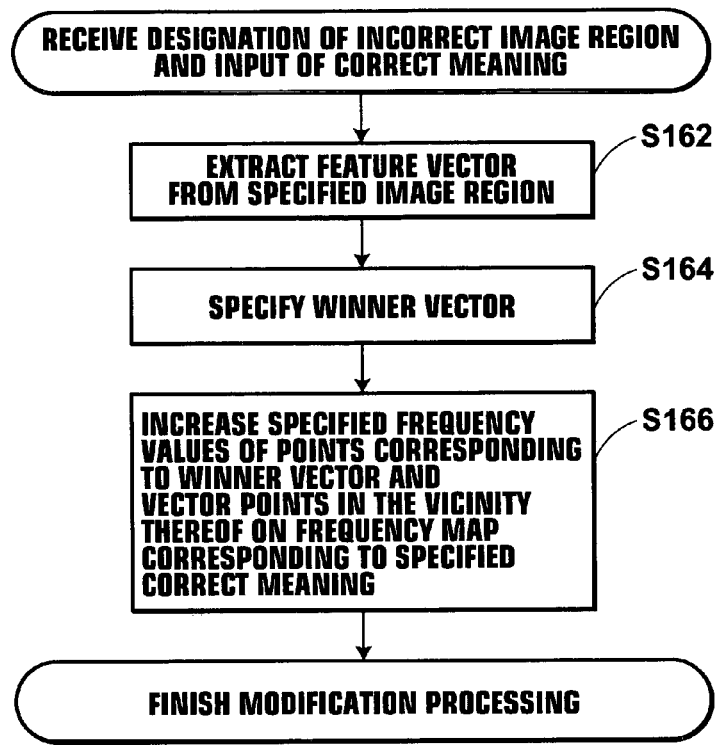
FIG. 24 is a flowchart showing a procedure for a third example of the processing performed by the modification part of the meaning determining apparatus of FIG. 20.

The third example of the modification processing shown in FIG. 24 is processing similar to that shown in FIG. 13 as the third example of the second learning step performed by the data learning apparatus according to the above-described one embodiment of the present invention. In the case of performing this processing of FIG. 24, data stored in the memory 68 is required to have a form of a combination of a self-organizing map and a plurality of frequency maps. Specified frequency values on each of the frequency maps may be the specified frequency values as they are obtained after the learning is finished or may be standardized specified frequency values. First, in Step S162, a feature vector is extracted from the image region to be additionally learned, which is designated by the modification input receiving part 74. Next, in Step S164, a reference feature vector having the smallest Euclidean distance from the feature vector extracted in Step S162 in a feature vector space is retrieved from the current self-organizing map stored in the memory 68 and is specified as a winner vector. Lastly, in Step S166, specified frequency values of those points corresponding to the winner vector specified in Step S164 and the vector points distributed in 3×3 vicinity of the winner vector on a frequency map corresponding to the correct meaning designated by the modification input receiving part 74 among the plurality of frequency maps stored in the memory 68 are increased by +1.

In the third example of the modification processing described above, used as the vicinity is of a fixed size, which is 3×3. However, the size and shape of the vicinity are not limited thereto. Furthermore, the present invention is not limited to the mode in which the same increment size is applied to the points corresponding to the winner vector and all the reference feature vectors in the vicinity thereof. For example, by adopting increment sizes in a Gaussian-like distribution, points closer to the point corresponding to the winner vector may have a larger increment size. Alternatively, the specified frequency values may be increased only in the point corresponding to the winner vector on the frequency map without performing the vicinity learning.

Figure 25:
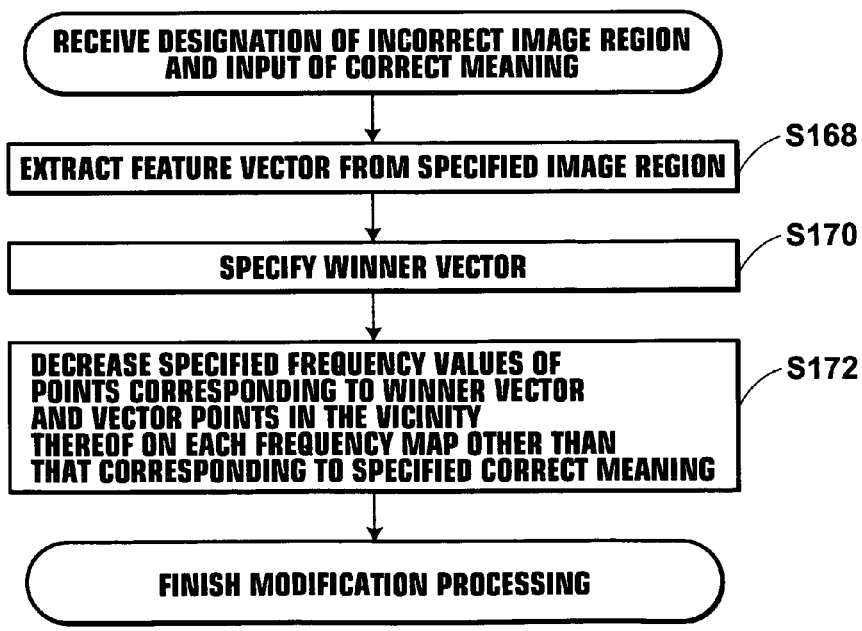
FIG. 25 is a flowchart showing a procedure for a fourth example of the processing performed by the modification part of the meaning determining apparatus of FIG. 20.
Figure 26A:
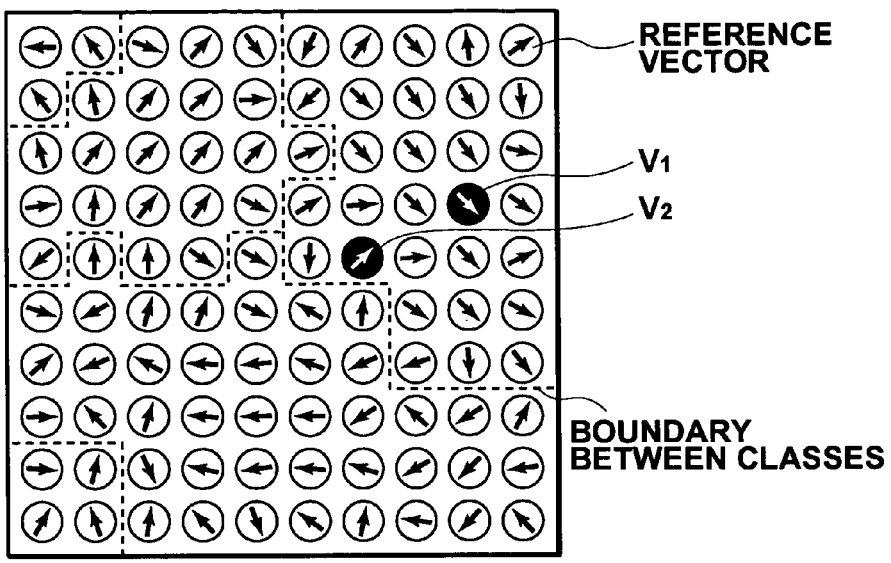
FIGS. 26A and 26B are conceptual views showing a self-organizing map and a map of corresponding classes obtained by a conventional data learning method based on modified counterpropagation.
Figure 26B:
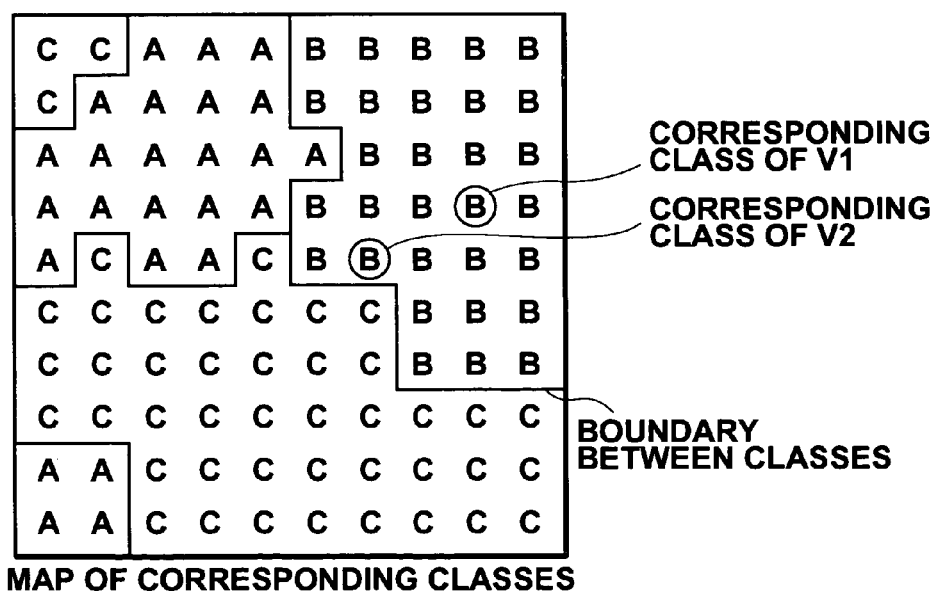

The fourth example of the modification processing shown in FIG. 25 is processing similar to that shown in FIG. 15 as the fourth example of the second learning step performed by the data learning apparatus according to the above-described one embodiment of the present invention. In the case of performing this processing of FIG. 25, data stored in the memory 68 is required to have a form of a combination of a self-organizing map and a plurality of frequency maps. Specified frequency values on each of the frequency maps may be the specified frequency values as they are obtained after the learning is finished or may be standardized specified frequency values. First, in Step S168, a feature vector is extracted from the image region to be additionally learned, which is designated by the modification input receiving part 74. Next, in Step S170, a reference feature vector having the smallest Euclidean distance from the feature vector extracted in Step S168 in a feature vector space is retrieved from the current self-organizing map stored in the memory 68 and is specified as a winner vector. Lastly, in Step S172, specified frequency values of those points corresponding to the winner vector specified in Step S170 and vector points distributed in 3×3 vicinity of the winner vector on respective frequency maps other than the frequency map corresponding to the correct meaning designated by the modification input receiving part 74 among the plurality of frequency maps stored in the memory 68 are decreased by −1.

Note that, in the fourth example of the modification processing described above, used as the vicinity is of a fixed size, which is 3×3. However, the size and shape of the vicinity are not limited thereto. Furthermore, the present invention is not limited to the mode in which the same decrement size is applied to the points corresponding to the winner vector and all the reference feature vectors in the vicinity thereof. For example, by adopting decrement sizes in a Gaussian-like distribution, points closer to the point corresponding to the winner vector may have a larger decrement size. Alternatively, the specified frequency values may be decreased only in the point corresponding to the winner vector on the frequency map without performing the vicinity learning.

In the fourth example of the modification processing described above, the modification of reducing the specified frequency values has been performed on all the frequency maps other than that corresponding to the correct meaning. However, the modification may be performed only on some of the frequency maps other than that corresponding to the correct meaning. For example, the modification of reducing the specified frequency values may be performed only on the frequency map showing the highest specified frequency value at the point corresponding to the winner vector specified in Step S170 described above.

Furthermore, in the first to fourth examples of the modification processing described above, the Euclidean distance between two feature vectors in the feature vector space is used as the "similarity". However, without being limited thereto, an inner product between two feature vectors or the like may be alternatively used.

Moreover, in the first to fourth examples of the modification processing described above, the modification part 76 extracts the feature vector from the specified image region. However, the feature vectors extracted by the feature vector extracting part 66 in the meaning determining processing may be stored in the memory and used as they are. In that case, in the first, third and fourth examples, the winner vectors specified by the winner vector specifying part 70 in the meaning determining processing may also be stored in the memory and used as they are.

Furthermore, the present invention is not limited to the mode in which the modification processing is performed every time a set of modification inputs is made at the modification input receiving part 74. The present invention also covers a mode in which the modification processing is performed at the stage where a certain amount of modification inputs are accumulated or a mode in which the modification processing is periodically performed.

Although some embodiments of the present invention have been described above in detail, these embodiments are for exemplification only. It is needless to say that a technical range of the present invention should be defined only by scope of claims in the present specification.

What is claimed is:

1. A data learning apparatus comprising:

first learning means for deriving a temporary self-organizing map in which classes are associated with respective vector points of reference feature vectors by learning first learning data including a plurality of first sample feature vectors for each of which a corresponding class is known; and second learning means for modifying the temporary self-organizing map and deriving a final self-organizing map by learning second learning data including a plurality of second sample feature vectors for each of which a corresponding class is known;

wherein the second learning means includes:

second vector specifying means for reading one of the second sample feature vectors out of the second learning data and specifying a second learning winner vector on the temporary self-organizing map which has the highest similarity to said one of the second sample feature vectors;

modification means for comparing a class associated with a vector point of the second learning winner vector to a corresponding class of said one of the second sample feature vectors indicated by the second learning data and, when the class associated with the vector point of the second learning winner vector is not identical to the corresponding class indicated by the second learning data, modifying the second learning winner vector and a plurality of reference feature vectors distributed in a second learning vicinity of the second learning winner vector on the temporary self-organizing map so as to reduce the similarity thereof to said one of the second sample feature vectors; and means for deriving the final self-organizing map by operating each of the second vector specifying means and the modification means once or repeatedly more than once for each of said plurality of second sample feature vectors.

2. The data learning apparatus according to claim 1, wherein the modification means further modifies the second learning winner vector and said plurality of reference feature vectors distributed in the second learning vicinity so as to increase the similarity thereof to said one of the second sample feature vectors, when the class associated with the vector point of the second learning winner vector is identical to the corresponding class of said one of the second sample feature vectors indicated by the second learning data.

3. The data learning apparatus according to claim 1, wherein the first learning means includes:

means for generating an initial self-organizing map on which a plurality of random reference feature vectors are distributed;

means for generating a plurality of frequency maps, in which initial values of specified frequency values allocated to respective points are zero, each of the frequency maps corresponding to one class;

first vector specifying means for reading one of first sample feature vectors out of the first learning data and specifying a first learning winner vector on the initial self-organizing map which has the highest similarity to said one of the first sample feature vectors;

update means for modifying the first learning winner vector and a plurality of reference feature vectors distributed in a first learning vicinity of the first learning winner vector on the initial self-organizing map so as to increase the similarity thereof to said one of the first sample feature vectors, and for increasing the specified frequency values in points corresponding to respective vector points of the first learning winner vector and said plurality of reference feature vectors distributed in the first learning vicinity on a frequency map corresponding to a corresponding class of said one of the first sample feature vectors indicated by the first learning data;

means for deriving the temporary self-organizing map by operating each of the first vector specifying means and the update means once or repeatedly more than once for each of said plurality of first sample feature vectors; and means for defining a class which is most likely to appear at each vector point on the temporary self-organizing map as the class associated with said vector point by referring to said plurality of frequency maps.

4. The data learning apparatus according to claim 1, wherein each of said plurality of first sample feature vectors and said plurality of second sample feature vectors is a vector having feature quantities indicating features of an image as components thereof, and each of the corresponding classes indicated by the first learning data and the second learning data is a class indicating a meaning of an image.

5. The data learning apparatus according to claim 4, wherein the meaning of an image corresponds to a descriptor of the contents depicted in an image, and is contained in the feature vectors as a parameter.

6. The data learning apparatus according to claim 1, wherein the first learning means includes:
means for generating a plurality of frequency maps, in which initial values of specified frequency values allocated to respective points are zero, each of the frequency maps corresponding to one class;
first vector specifying means for reading one of first sample feature vectors out of the first learning data and specifying a first learning winner vector on the initial self-organizing map
which has the highest similarity to said one of the first sample feature vectors; and update means for modifying the first learning winner vector and a plurality of reference feature vectors distributed in a first learning vicinity of the first learning winner vector on the initial self-organizing map so as to increase the similarity thereof to said one of the first sample feature vectors, and for increasing the specified frequency values in points corresponding to respective vector points of the first learning winner vector and said plurality of reference feature vectors distributed in the first learning vicinity on a frequency map corresponding to a corresponding class of said one of the first sample feature vectors indicated by the first learning data.

7. The data learning apparatus according to claim 1, wherein the first learning means includes:
means for defining a class which is most likely to appear at each vector point on the temporary self-organizing map as the class associated with said vector point by referring to a plurality of frequency maps.

8. A computer-readable recording medium carrying a data learning program for making a computer operate as:
first learning means for deriving a temporary self-organizing map in which classes are associated with respective vector points of reference feature vectors by learning first learning data including a plurality of first sample feature vectors for each of which a corresponding class is known; and
second learning means for modifying the temporary self-organizing map and deriving a final self-organizing map by learning second learning data including a plurality of second sample feature vectors for each of which a corresponding class is known;
wherein the second learning means includes:
second vector specifying means for reading one of the second sample feature vectors out of the second learning data and specifying a second learning winner vector on the temporary self-organizing map which has the highest similarity to said one of the second sample feature vectors;
modification means for comparing a class associated with a vector point of the second learning winner vector to a corresponding class of said one of the second sample feature vectors indicated by the second learning data and, when the class associated with the vector point of the second learning winner vector is not identical to the corresponding class indicated by the second learning data, modifying the second learning winner vector and a plurality of reference feature vectors distributed in a second learning vicinity of the second learning winner vector on the temporary self-organizing map so as to reduce the similarity thereof to said one of the second sample feature vectors; and
means for deriving the final self-organizing map by operating each of the second vector specifying means and the modification means once or repeatedly more than once for each of said plurality of second sample feature vectors.

9. The recording medium according to claim 8, wherein each of said plurality of first sample feature vectors and said plurality of second sample feature vectors is a vector having feature quantities indicating features of an image as components thereof, and each of the corresponding classes indicated by the first learning data and the second learning data is a class indicating a meaning of an image.

10. An apparatus for determining meanings of a target image or an image region by use of a self-organizing map obtained after learning, said self-organizing map having meanings of images associated with respective vector points thereon, comprising:
extraction means for extracting one or a plurality of feature vectors from the target image or the image region;
winner vector specifying means for specifying a winner vector on the self-organizing map which has the highest similarity to the feature vector for each of said one or plurality of feature vectors;
meaning determining means for determining the meaning of the target image or the image region based on meanings associated with respective vector points of the winner vectors;
input means for receiving designation of a target image or an image region of which a correct meaning cannot have been determined by the meaning determining means, and input of the correct meaning of said target image or said image region; and
modification means for modifying the self-organizing map by additionally learning the target image or the image region which is designated through the input means,
wherein, for each of one or a plurality of feature vectors extracted from the designated target image or image region, the modification means modifies a winner vector having the highest similarity to the feature vector and a plurality of reference feature vectors distributed in a vicinity of the winner vector on the self-organizing map so as to reduce the similarity thereof to said feature vector.

* * * * *